United States Patent
Choi

(10) Patent No.: US 9,711,142 B2
(45) Date of Patent: Jul. 18, 2017

(54) MOBILE TERMINAL AND CONTROLLING METHOD THEREOF

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/982,898

(22) Filed: Dec. 29, 2015

(65) Prior Publication Data
US 2017/0025122 A1 Jan. 26, 2017

(30) Foreign Application Priority Data
Jul. 20, 2015 (KR) ........................ 10-2015-0102198

(51) Int. Cl.
| | |
|---|---|
| G10L 21/00 | (2013.01) |
| G10L 25/00 | (2013.01) |
| G10L 15/00 | (2013.01) |
| G10L 15/22 | (2006.01) |
| G10L 15/26 | (2006.01) |
| G06F 3/16 | (2006.01) |
| G06F 3/041 | (2006.01) |
| G06F 3/0488 | (2013.01) |
| G06F 1/32 | (2006.01) |

(52) U.S. Cl.
CPC ............ *G10L 15/22* (2013.01); *G06F 1/3234* (2013.01); *G06F 3/0416* (2013.01); *G06F 3/04886* (2013.01); *G06F 3/167* (2013.01); *G10L 15/26* (2013.01)

(58) Field of Classification Search
USPC .... 704/235, 246, 243, 270, 270.1, 275, 260, 704/258
See application file for complete search history.

(56) References Cited

U.S. PATENT DOCUMENTS

| | | | | |
|---|---|---|---|---|
| 7,778,632 | B2* | 8/2010 | Kurlander | H04M 1/72566 348/61 |
| 8,331,992 | B2* | 12/2012 | Stallings | G06F 3/0488 455/412.2 |
| 8,947,382 | B2* | 2/2015 | Winkler | 345/156 |
| 2005/0221791 | A1* | 10/2005 | Angelhag | H04B 1/1615 455/343.5 |
| 2007/0099602 | A1* | 5/2007 | Kurlander | H04M 1/72566 455/418 |

(Continued)

FOREIGN PATENT DOCUMENTS

| | | |
|---|---|---|
| EP | 1 592 211 A2 | 11/2005 |
| WO | WO 2012/030001 A1 | 3/2012 |

*Primary Examiner* — Edgar Guerra-Erazo
(74) *Attorney, Agent, or Firm* — Birch, Stewart, Kolasch & Birch, LLP

(57) ABSTRACT

A mobile terminal including a display; a proximity sensor configured to sense a predetermined action of a user; an audio output unit; and a controller configured to deactivate the display and enter the mobile terminal into a standby mode while maintaining the proximity sensor in an activated state, and in response to the proximity sensor sensing the predetermined action by the user, output audio data through the audio output unit while the display is deactivated corresponding to information collected about a previous event that occurred on the mobile terminal.

20 Claims, 17 Drawing Sheets

(56) References Cited

U.S. PATENT DOCUMENTS

| | | |
|---|---|---|
| 2008/0220752 A1 | 9/2008 | Forstall et al. |
| 2010/0105364 A1 | 4/2010 | Yang |
| 2010/0251177 A1* | 9/2010 | Geppert ............. G06F 3/04817 715/821 |
| 2010/0269040 A1 | 10/2010 | Lee |
| 2011/0035445 A1* | 2/2011 | Eickhoff ................ G06Q 10/10 709/204 |
| 2012/0052817 A1 | 3/2012 | Lee et al. |
| 2012/0151400 A1* | 6/2012 | Hong ................. G06F 3/04817 715/769 |
| 2013/0222270 A1* | 8/2013 | Winkler ............. H04M 1/0233 345/173 |
| 2013/0332847 A1 | 12/2013 | Choi et al. |
| 2015/0138101 A1 | 5/2015 | Park et al. |
| 2015/0338926 A1* | 11/2015 | Park ........................ G06F 3/011 345/156 |

\* cited by examiner

FIG. 7
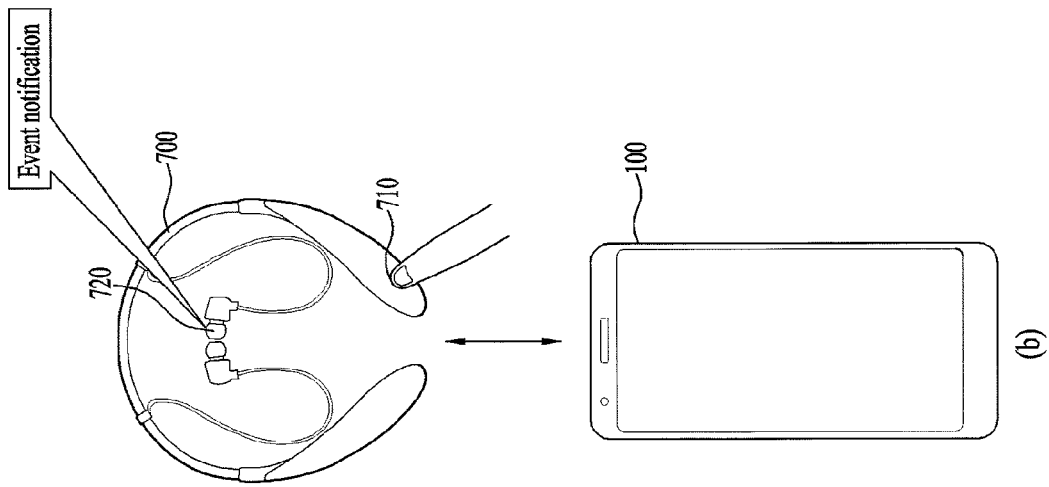
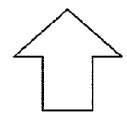
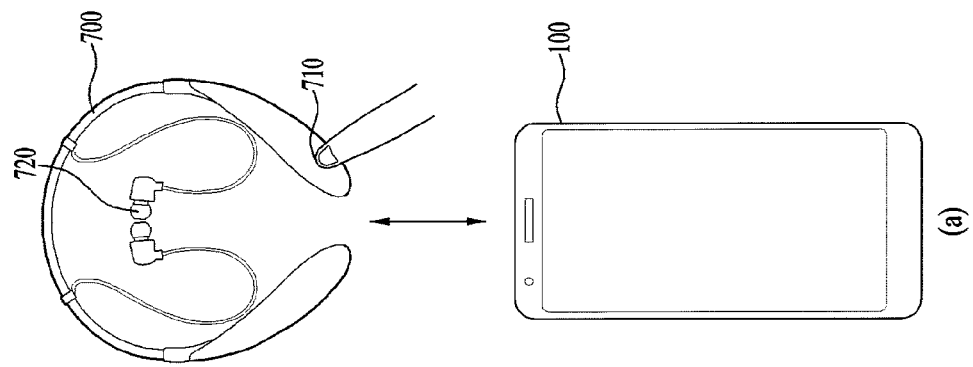

MOBILE TERMINAL AND CONTROLLING METHOD THEREOF

Pursuant to 35 U.S.C. §119(a), this application claims priority to Korean Patent Application No. 10-2015-0102198 filed on Jul. 20, 2015 in Korea, the entire contents of which is hereby incorporated by reference in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of the terminal are becoming diversified, the terminal tends to be implemented as a multimedia player provided with complex functions such as photographing of photos or videos, playback of music or video files, game play, broadcast reception and the like, for example. Efforts are ongoing to support and increase the functionality of mobile terminals. Such efforts include software and hardware improvements, as well as changes and improvements in the structural components. Recently, many ongoing efforts are made to discuss a user experience and a user interface for facilitating a user's accessibility to various functions of a mobile terminal.

SUMMARY OF THE INVENTION

Accordingly, one object of the present invention is to address the above-noted and other problems.

Another object of the present invention is to provide information fit for an intention of a user using the mobile terminal in a deactivated state of a display. Another object of the present invention is to provide a solution for obtaining an intention of a user using the mobile terminal in a deactivated state of a display.

To achieve these objects and other advantages and in accordance with the purpose of the invention, as embodied and broadly the present invention provides a mobile terminal including a display; a proximity sensor configured to sense a predetermined action of a user; an audio output unit; and a controller configured to deactivate the display and enter the mobile terminal into a standby mode while maintaining the proximity sensor in an activated state, and in response to the proximity sensor sensing the predetermined action by the user, output audio data through the audio output unit while the display is deactivated corresponding to information collected about a previous event that occurred on the mobile terminal. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 7 is a diagram illustrating one example of a method of providing information of an event through an external device connected to a mobile terminal by a short range communication according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein illustrating various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1A:
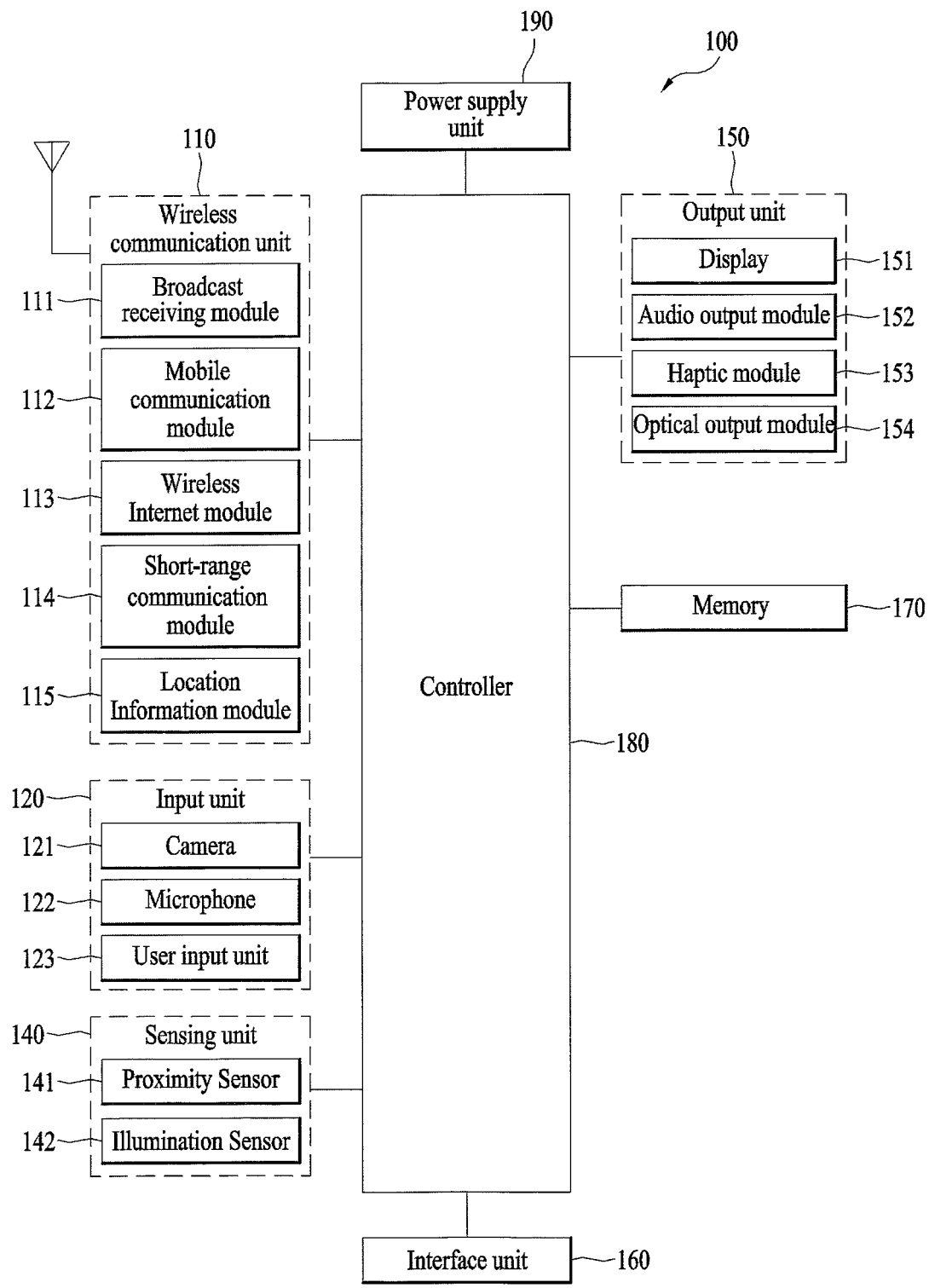
FIG. 1A is a block diagram of a mobile terminal in accordance with the present disclosure.
Figure 1B:
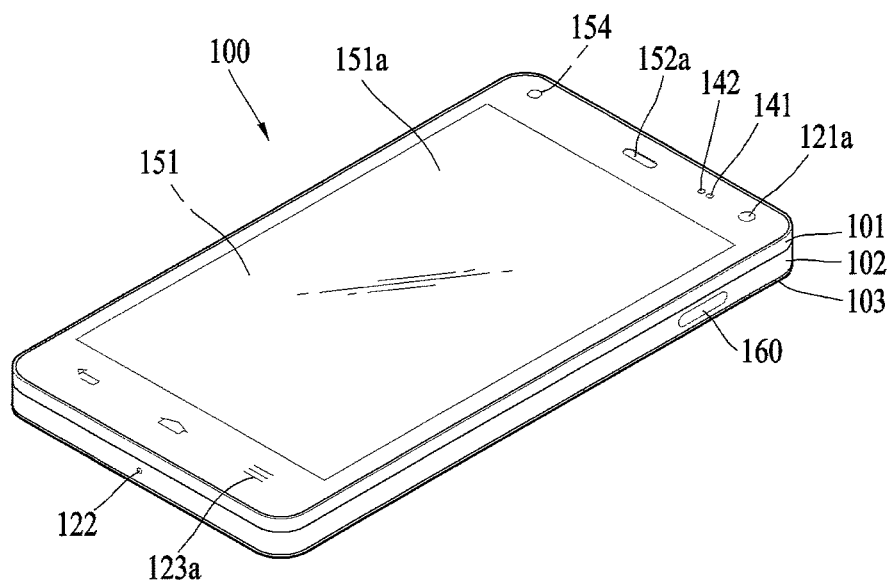
FIGS. 1B and 1C are conceptual views of one example of the mobile terminal, viewed from different directions.
Figure 1C:
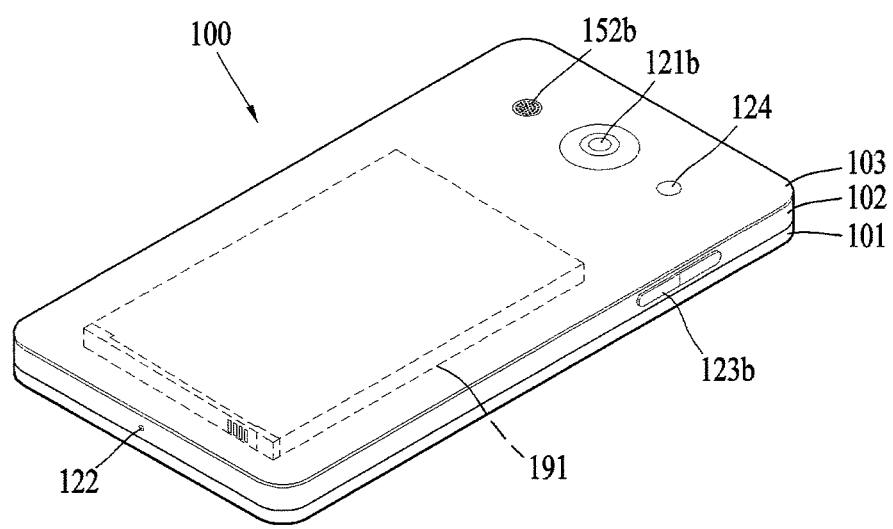

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and greater or fewer components may alternatively be implemented. Referring now to FIG. 1A, the mobile terminal 100 is shown having the wireless communication unit 110 configured with several commonly implemented components.

The wireless communication unit 110 typically includes one or more modules which permit communication such as wireless communication between the mobile terminal 100 and a wireless communication system, communication between the mobile terminal 100 and another mobile terminal, communication between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by the controller 180 according to device parameters, user commands, and combinations thereof.

Further, the sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154. The display 151 may have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. For example, the interface unit 160 may include any of wired or wireless ports, external power supply ports, wired or wireless data ports, memory card ports, ports for connecting a device having an identification module, audio input/output (I/O) ports, video I/O ports, earphone ports, and the like. In some instances, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 stores application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170 and executed by the controller 180 to perform an operation (or function) for the mobile terminal 100.

The controller 180 typically functions to control an overall operation of the mobile terminal 100, in addition to the operations associated with the application programs. The controller 180 can process or provide appropriate information or functions to a user by processing signals, data, information and the like input or output through the above-mentioned components or executing application programs saved in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A according to the execution of an application program that have been stored in the memory 170.

The power supply unit 190 can receive external power or provide internal power in order to supply appropriate power required for operating elements and components included in the mobile terminal 100. The power supply unit 190 may include a battery embedded in the terminal body, or detachable from the terminal body.

At least one portion of the above-mentioned components can cooperatively operate to embody operations, controls or controlling methods of the mobile terminal according to various embodiments mentioned in the following description. In addition, the operations, controls or controlling methods of the mobile terminal can be embodied on the mobile terminal by executing at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

A system can generate and transmit a broadcast signal and/or broadcast associated information, or a server can receive a pre-generated broadcast signal and/or broadcast associated information and send such items to the mobile terminal. The broadcast signal may be implemented using any of a TV broadcast signal, a radio broadcast signal, a data broadcast signal, and combinations thereof, among others. The broadcast signal may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like. Broadcast signals and/or broadcast associated information received via the broadcast receiving module 111 may be stored in a suitable device, such as the memory 170.

In addition, the mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access and can be internally or externally coupled to the mobile terminal 100. The wireless Internet module 113 can also transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 can transmit/receive data according to one or more of such wireless Internet technologies, and other Internet technologies as well. In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communication include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communication between the mobile terminal 100 and a wireless communication system, communication between the mobile terminal 100 and another mobile terminal 100, or communication between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 can sense or recognize the wearable device, and permit communication between the wearable device and the mobile terminal 100. In addition, when the sensed wearable device is a device which is authenticated to communicate with the mobile terminal 100, the controller 180, for example, can cause transmission of data processed in the mobile terminal 100 to the wearable device via the short-range communication module 114. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 permits various types of input to the mobile terminal 120. Examples of such input include audio, image, video, data, and user input. Image and video input is often obtained using one or more cameras 121. Such cameras 121 process image frames of still pictures or video obtained by image sensors in a video or image capture mode. The processed image frames can be displayed on the display 151 or stored in memory 170. In some instances, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated while receiving the external audio.

The user input unit 123 is a component that permits input by a user. Such user input enables the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control an operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense a presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will be referred to herein to denote the scenario in which a pointer is positioned to be proximate to the touch screen without contacting the touch screen. The term "contact touch" will be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 can sense a proximity touch, and proximity touch patterns (for example, distance, direction, speed, time, position, moving status, and the like).

In general, the controller 180 processes data corresponding to proximity touches and proximity touch patterns sensed by the proximity sensor 141, and outputs visual information on the touch screen. In addition, the controller 180 can execute different operations or process different data according to whether a touch with respect to a point on the touch screen is either a proximity touch or a contact touch.

A touch sensor can sense a touch applied to the touch screen, such as the display 151, using any of a variety of touch methods. Examples of such touch methods include a resistive type, a capacitive type, an infrared type, and a magnetic field type, among others. As one example, the touch sensor may be configured to convert changes of pressure applied to a specific part of the display 151, or convert a capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller can process the received signals, and then transmit corresponding data to the controller 180. Accordingly, the controller 180 can sense which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan a movement of the physical object in proximity to the touch screen. In more detail, the photo sensor may include photo diodes and transistors at rows and columns to scan content received at the photo sensor using an electrical signal which changes according to the quantity of applied light. Namely, the photo sensor can calculate the coordinates of the physical object according to a variation of light to thus obtain position information of the physical object.

The display 151 is generally configured to output information processed in the mobile terminal 100. For example, the display 151 can display execution screen information of an application program executing at the mobile terminal 100 or user interface (UI) and graphic user interface (GUI) information in response to the execution screen information.

In some embodiments, the display 151 may be implemented as a stereoscopic display unit for displaying stereoscopic images. A typical stereoscopic display unit employs a stereoscopic display scheme such as a stereoscopic scheme (a glass scheme), an auto-stereoscopic scheme (glassless scheme), a projection scheme (holographic scheme), or the like.

In general, a 3D stereoscopic image includes a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" refers to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by a user selection or setting by the controller 180. For example, the haptic module 153 can output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may also be terminated as the mobile terminal senses that a user has checked the generated event, for example.

Further, the interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 typically controls the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machinereadable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display 151, the first audio output unit 152a, the second audio output unit 152b, the proximity sensor 141, the illumination sensor 142, the optical output module 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the display units 151 may be arranged on one side, either spaced apart from each other, or these devices may be integrated, or these devices may be arranged on different surfaces.

The display 151 may also include a touch sensor which senses a touch input received at the display unit. When a touch is input to the display 151, the touch sensor may be configured to sense this touch and the controller 180, for example, may generate a control command or other signal corresponding to the touch. The content which is input in the touching manner may be text or a numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display 151 may also form a touch screen together with the touch sensor. Here, the touch screen may serve as the user input unit 123 (see FIG. 1A). Therefore, the touch screen may replace at least some of the functions of the first manipulation unit 123a.

Further, the first audio output module 152a may be implemented in the form of a speaker to output voice audio, alarm sounds, multimedia audio reproduction, and the like. The window 151a of the display 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller 180 can control the optical output unit 154 to stop the light output. Further, the first camera 121a can process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof. Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display 151, and the like. The rear input unit may be configured to permit touch input, a push input, or combinations thereof.

In addition, the rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

Figure 2:
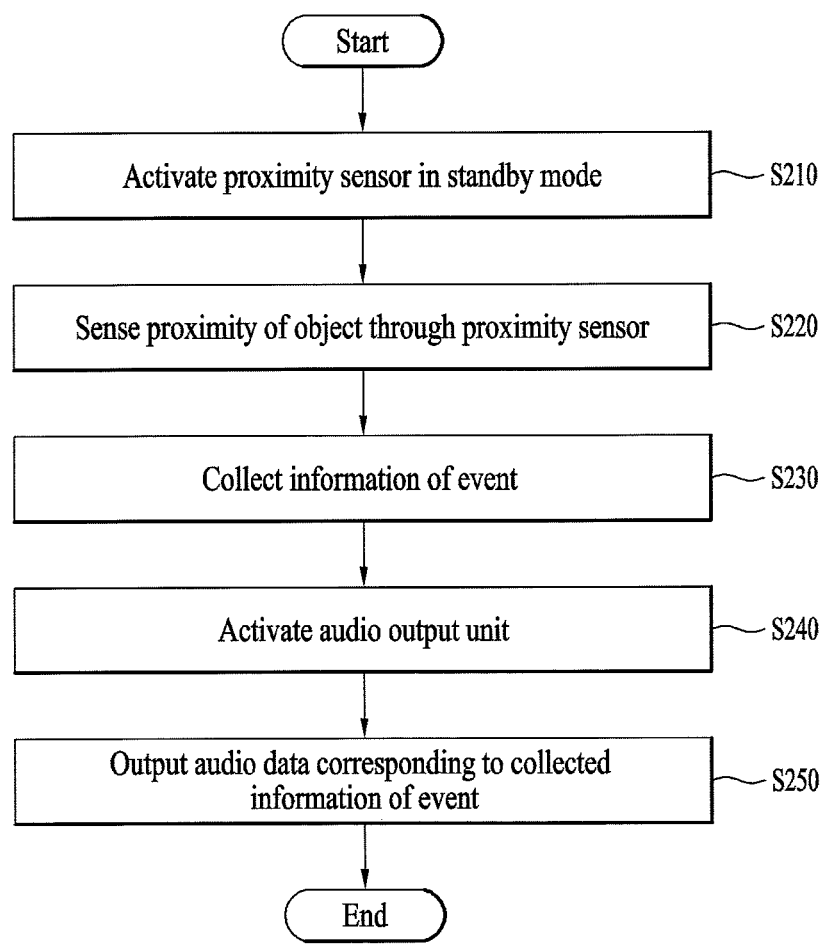
FIG. 2 is a flowchart illustrating one example of a method of providing information fit for an intention of a user using a mobile terminal when the display unit is deactivated according to one embodiment of the present invention.

Next, FIG. 2 is a flowchart illustrating one example of a method of providing information fit for an intention of a user using a mobile terminal when the display unit is deactivated after obtaining the user's intention according to one embodiment of the present invention. Referring to FIG. 2, if the display 151 is turned off, the controller 180 switches the mobile terminal 100 to a standby mode and activates the proximity sensor (S201). Before the mobile terminal 100 is switched to the standby mode, if the proximity sensor is activated, the activated state of the proximity senor can be held in the standby mode.

In this instance, the meaning of 'switching the mobile terminal 100 to the standby mode' corresponds to a minimum power required for maintaining a preset function of the mobile terminal 100 being currently supplied while the display 151 is turned off. In particular, a power may not be supplied to an operation module not used for a preset function among the operation modules of the mobile terminal 100. When the mobile terminal 100 enter the standby mode, the controller 180 can be supplied with the power required for maintaining the preset function only. Further, the meaning of 'turning off the display 151' may mean that the operation required for maintaining the preset function is maintained in an activated state even though a display state of the display 151 is deactivated.

In addition, the controller 180 senses a presence or non-presence of proximity of an object through the proximity sensor (S220). In this instance, the object may include a person existing outside the mobile terminal 100, a thing existing outside the mobile terminal 100, or the like. If the presence of the object in a preset distance is sensed, the proximity sensor can deliver a preset signal to the controller 180.

If the proximity of the object is sensed through the proximity sensor, the controller 180 collects information of an event having occurred in the standby mode (S230). According to an embodiment, after the standby mode has been entered, the controller 180 can collect the information of the event having occurred in the standby mode despite that the proximity of the object has not been sensed yet through the proximity sensor.

For instance, the information of the event may include at least one of a call signal received for the standby mode, a text message received in the standby mode (or, while absence), an SNS (social network service) message received for the standby mode, a nearby environment notification information based on a location information of the mobile terminal 100, a recommended content information based on an information of a user of the mobile terminal 100, information (e.g., a weather information, a schedule information, etc.) based on a current time, information (e.g., a schedule information registered at the mobile terminal 100 at work, etc.) based on a location information of the mobile terminal 100, a recommended content information based on a use pattern of the mobile terminal 100, and the like.

In this instance, the nearby environment notification information based on the location information of the mobile terminal 100 may include a nearby shop information of the mobile terminal 100, a coupon & price information of a nearby shop, a nearby tour information of the mobile terminal 100, and the like. In this instance, the controller 180 can maintain the activated state of the location information module 115 during the standby mode. If the proximity of the object is sensed through the proximity senor, the controller 180 can activate the location information module 115.

The recommended content information based on the information of the user of the mobile terminal 100 may include a recommended music information based on user's sex, age and/or the like or a recommended movie information based on user's sex, age and/or the like. The recommended content information based on the use pattern of the mobile terminal 100 may include a recommended content information based on a type of an application used in the mobile terminal 100, a type of a webpage accessed by the mobile terminal 100, or a time of a webpage accessed by the mobile terminal 100.

If the proximity of the object is sensed through the proximity senor, the controller 180 activates the audio output unit 152 (S240). Subsequently, the controller 180 can output audio data corresponding to the collected information of the event through the audio output unit 152 (S250). In particular, the controller 180 can output the audio data corresponding to the collected information of the event to the audio output unit 152 in a preset order or output only the audio data corresponding to the information of the event belonging to a type preset by a user in the collected information of the event to the audio output unit 152 in a preset order. In the step S230, the controller 180 can collect only the information of the event belonging to a type preset by a user.

Figure 3:
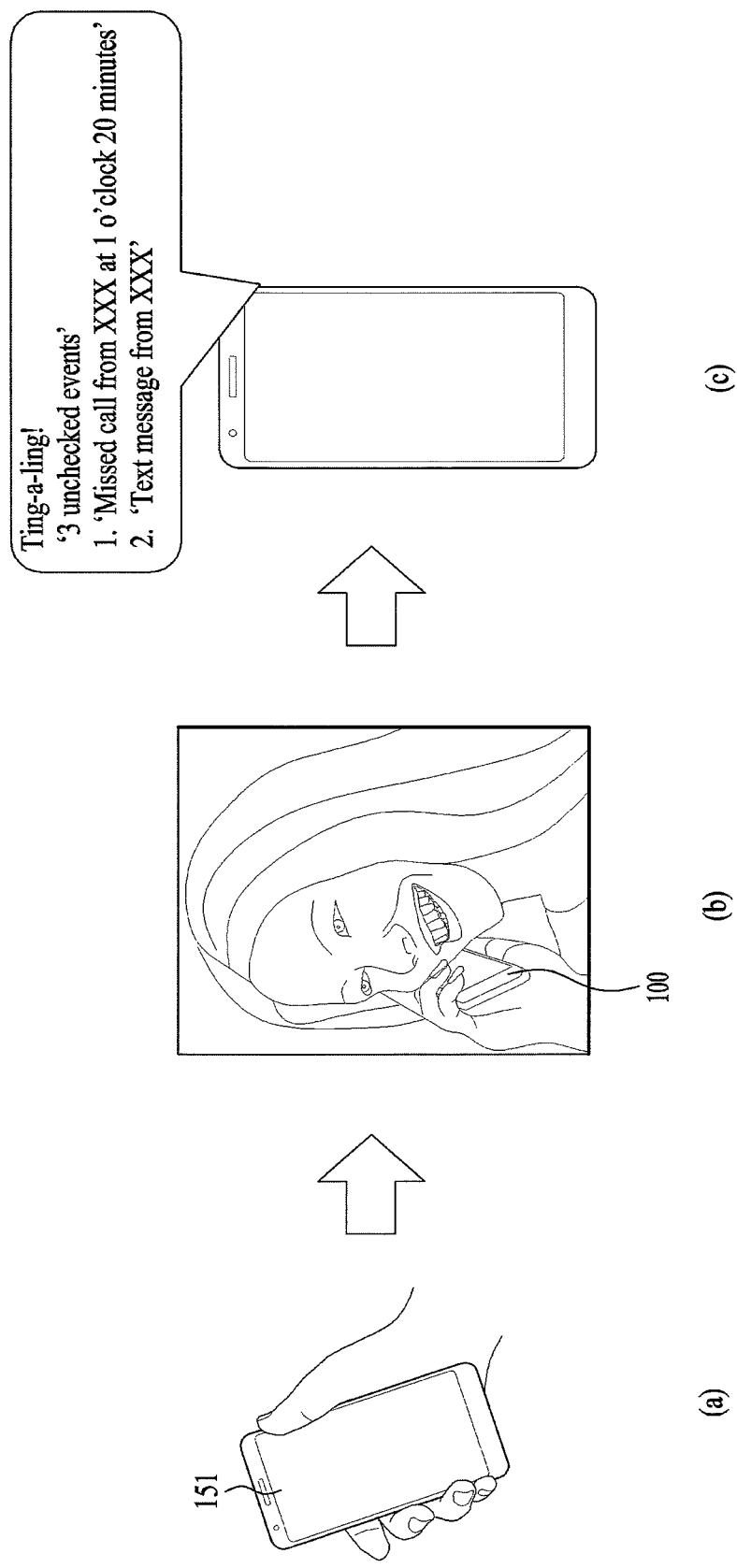
FIG. 3 is a diagram illustrating one example of a method of providing information fit for an intention of a user using a mobile terminal when the display unit is deactivated according to one embodiment of the present invention.

According to the present embodiment, while the display 151 is turned off, if a user takes an action of lifting and holding the mobile terminal 100 to their ear, the user can be advantageously provided with the information of the event intended by the user. In particular, FIG. 3 is a diagram illustrating one example of a method of providing information fit for an intention of a user using a mobile terminal when the display unit is deactivated according to one embodiment of the present invention.

Referring to FIG. 3(a), if the display 151 is turned off, the controller 180 switches the mobile terminal 100 to a standby mode. For example, if a command for selecting a power button is detected or the mobile terminal 100 is not used over a preset time, the controller 180 turns off the display 151 and can enter the standby mode. When the mobile terminal 100 enters the standby mode, the controller 180 can activate the proximity sensor. If the proximity sensor is already activated, the controller 180 can maintain the activated state of the proximity sensor.

Referring to FIG. 3(b), while the display 151 is turned off, the controller 180 can sense a presence or non-presence of proximity of an object (e.g., person) through the proximity sensor. If a user desires to listen to a prescribed information from the mobile terminal 100, the user can hold the mobile terminal 100 to their ear.

Referring to FIG. 3(c), if the proximity of the object is sensed through the proximity sensor, the controller 180 activates the audio output unit 152 and then outputs audio data corresponding to information of a preset event through the audio output unit 152. The order of the audio data output through the audio output unit 152 may be set to a default or may be preset by a user. Moreover, a type of the event information provided through the audio output unit 152 may be set to a default or may be preset by a user.

Figure 4:
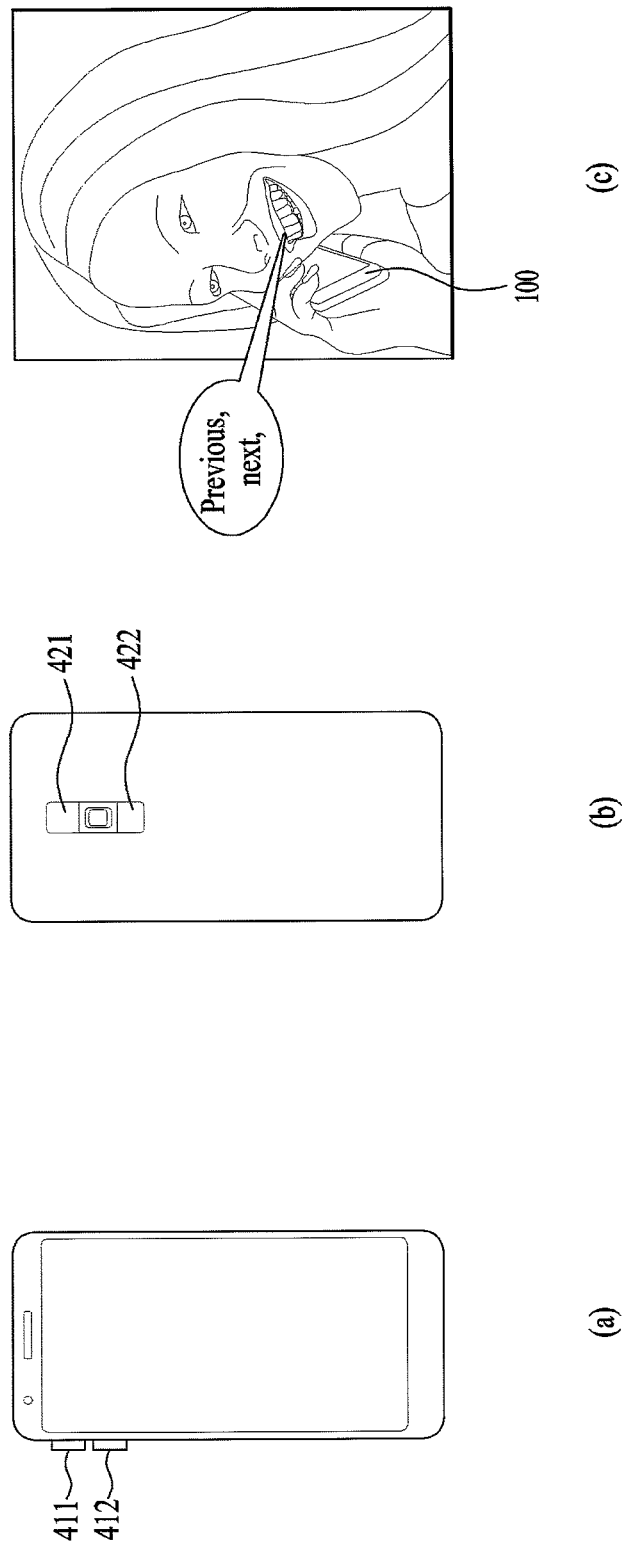
FIG. 4 is a diagram illustrating one example of a method of listening to previous information or next information while providing information in a mobile terminal according to one embodiment of the present invention.

Next, FIG. 4 is a diagram illustrating one example of a method of listening to previous information or next information while providing information in a mobile terminal according to one embodiment of the present invention. Referring to FIG. 4, if a proximity of an object is sensed through the proximity sensor in a standby mode, the controller 180 can output audio data corresponding to information for each preset event through the audio output unit 152 in a preset order.

If a first command is detected while outputting a first audio data corresponding to information of a first event, the controller 180 stops outputting the first audio data and can output second audio data corresponding to information of a second event, which was output right before the output of the first audio data, through the audio output unit 152. If a second command is detected while outputting the first audio data corresponding to the information of the first event, the controller 180 stops outputting the first audio data and can output a third audio data corresponding to information of a third event, which is scheduled to be output after the first audio data, through the audio output unit 152.

For instance, referring to FIG. 4(*a*), the user input unit 123 includes a first key 411 and a second key 412. In particular, the first key 411 and the second key 412 may be provided to an outer lateral surface of the mobile terminal 100. In this instance, the first key 411 may be configured to increase a value of a preset function of the mobile terminal 100, while the second key 412 may be configured to decrease a value of the preset function of the mobile terminal 100. For example, the first key 411 may include a volume-up key and the second key 412 may include a volume-down key. According to the example shown in FIG. 4(*a*), the controller 180 can recognize selecting the first key 411 as the first command and recognize selecting the second key 412 as the second command.

In another instance, referring to FIG. 4(*b*), the user input unit 123 includes a first key 421 and a second key 422. In particular, the first key 421 and the second key 422 may be provided to an outer rear surface of the mobile terminal 100. In this instance, the first key 421 may be configured to increase a value of a preset function of the mobile terminal 100, while the second key 422 may be key configured to decrease a value of the preset function of the mobile terminal 100.

For example, the first key 421 may include a volume-up key and the second key 422 may include a volume-down key. According to the example shown in FIG. 4(*b*), the controller 180 can recognize selecting the first key 421 as the first command and recognize selecting the second key 422 as the second command.

In still another instance, the controller 180 can include a voice recognition unit. According to an embodiment, the voice recognition unit can be embodied separately from the controller 180. Further, the voice recognition unit can convert a voice signal into text corresponding to the voice signal. In addition, the memory 170 can store a program or algorithm required for the voice recognition.

If a proximity of an object is sensed through the proximity senor in the standby mode or the first audio data is currently output, the controller 180 activates the microphone 122. If so, the voice recognition unit can convert a voice signal obtained through the microphone 122 into text. When the controller 180 activates the microphone 122, the controller 180 can activate a voice recognition function as well. If the text (e.g., 'previous') converted from the voice signal corresponds to the first command, the controller 180 stops outputting the first audio data and outputs the second audio data through the audio output unit 152. If the text (e.g., 'next') converted from the voice signal corresponds to the second command, the controller 180 stops outputting the first audio data and outputs the third audio data through the audio output unit 152.

In addition, according to one embodiment of the present invention, when a screen lock is set in the mobile terminal 100, the controller 180 can activate an interface for releasing the screen lock before providing information to a user. This is described in detail with reference to FIGS. 5 and 6 as follows. In particular, FIG. 5 is a diagram illustrating one example of a method of activating an interface for releasing a screen lock before outputting audio data corresponding to information of an event when the screen lock is set in a mobile terminal according to one embodiment of the present invention.

Figure 5:
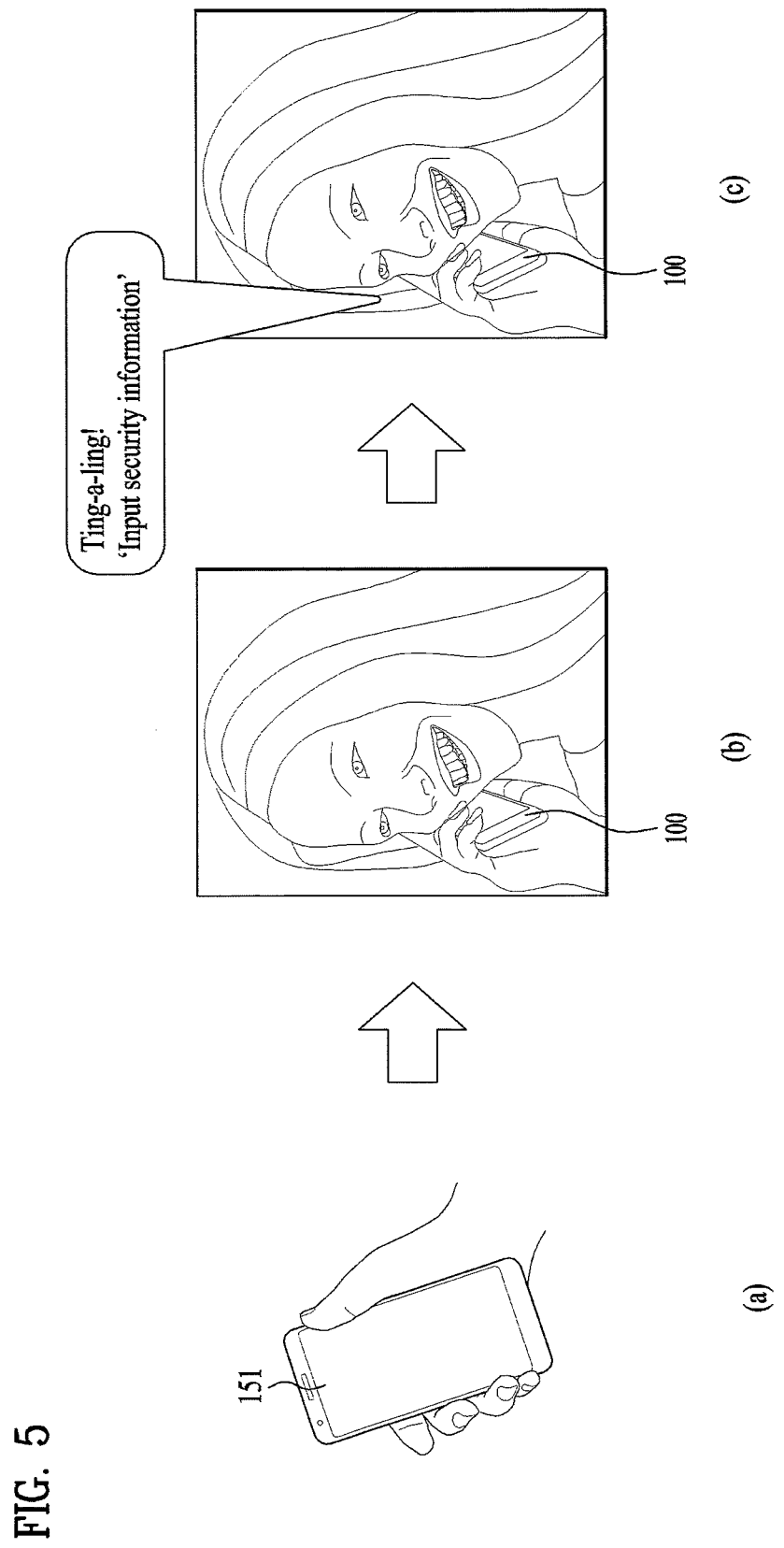
FIG. 5 is a diagram illustrating one example of a method of activating an interface for releasing a screen lock before outputting audio data corresponding to information of an event when the screen lock is set in a mobile terminal according to one embodiment of the present invention.

Referring to FIG. 5(*a*), if the display 151 is turned off, the controller 180 switches the mobile terminal 100 to a standby mode and activates the proximity sensor. Referring to FIG. 5(*b*), the controller 180 can sense a presence or non-presence of proximity of an object through the proximity sensor in the standby mode. After the standby mode has been entered or if the proximity of the object is sensed through the proximity sensor in the standby mode, the controller 180 can collect information of an event occurring in the standby mode.

Referring to FIG. 5(*c*), although the proximity of the object is sensed through the proximity sensor in the standby mode, if a lock screen is set in the mobile terminal 100, the controller 180 can activate an interface for receiving a security information for releasing the screen lock. For instance, if the security information includes a preset voice tone information or a keyword voice information, the interface includes the microphone 122. If the security information includes a preset fingerprint information, the interface includes a fingerprint recognition unit. Further, the controller 180 can output audio data for inducing an input of a security information through the audio output unit 152. In addition, a type of a security information for releasing a screen lock may be set by a user in advance.

According to an embodiment, if the preset security information is not received, the controller 180 does not provide the collected information of the event or outputs only audio data corresponding to information of a preset event among the collected information through the audio output unit 152. For example, the controller 180 can output only the audio data corresponding to information (e.g., a weather information, a nearby environment notification information, etc.) of the event irrespective of personal information of a user of the mobile terminal 100 to the audio output unit 152 and not output the audio data corresponding to the information (e.g., information corresponding to a missed call signal, a recommended content information based on the information of the user of the mobile terminal 100, etc.) of the event related to the personal information of the user of the mobile terminal 100. The information of the preset event can also be determined according to a reference set to a default or be preset by the user of the mobile terminal 100.

Further, according to the present embodiment, if a preset security information for releasing a screen lock of the mobile terminal 100 is input, the controller 180 outputs audio data corresponding to the collected information of the event through the audio output unit 152, but may not activate the display 151 unless a preset condition is met.

Figure 6:
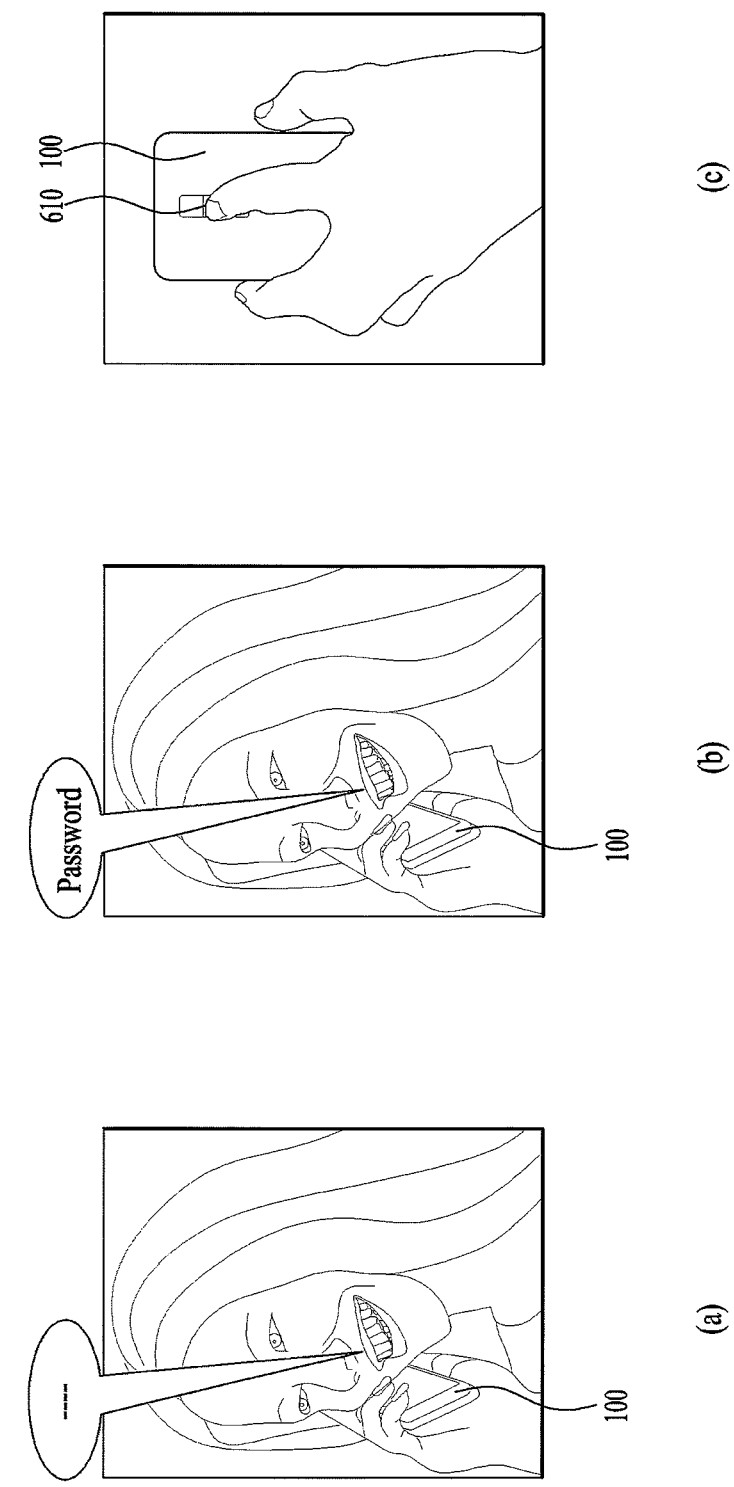
FIG. 6 is a diagram illustrating types of security information inputtable in the embodiment shown in FIG. 5.

Next, FIG. 6 is a diagram illustrating types of security information inputtable in the embodiment shown in FIG. 5. In particular, FIG. 6(*a*) shows one example of when security information for releasing a screen lock of the mobile terminal 100 is preset voice tone information. Although a proximity of an object is sensed through the proximity sensor in the standby mode, if a screen lock is set in the mobile terminal 100, the controller 180 activates the microphone 122 and can then analyze a voice signal obtained through the activated microphone 122. By analyzing a strength of the obtained voice signal, a waveform of the obtained voice signal and the like, the controller 180 can determine whether the obtained voice signal corresponds to the preset voice tone information.

Further, it is not mandatory for a user of the mobile terminal 100 to speak a determined keyword. That is, it may be enough for the user of the mobile terminal 100 to speak a word over preset syllables. If the obtained voice signal fails to correspond to the preset voice tone information, the controller 180 does not provide the collected information of the events or outputs only audio data corresponding to the information of the preset event among the collected information of the events through the audio output unit 152. If the obtained voice signal corresponds to the preset voice tone information, the controller 180 can output audio data corresponding to the collected information of the events through the audio output unit 152.

FIG. 6(b) shows one example of security information for releasing a screen lock of the mobile terminal 100 being preset keyword voice information. Although a proximity of an object is sensed through the proximity sensor in the standby mode, if a screen lock is set in the mobile terminal 100, the controller 180 (or the voice recognition unit) activates the microphone 122 and can then analyze a voice signal obtained through the activated microphone 122. By converting the obtained voice signal into text, the controller 180 can determine whether the text converted from the obtained voice signal corresponds to the preset keyword voice information.

If the text (e.g., 'password', etc.) converted from the obtained voice signal fails to correspond to the preset keyword voice information, the controller 180 does not provide the collected information of the events or can output only audio data corresponding to the information of the preset event among the collected information of the events through the audio output unit 152. If the text (e.g., 'password', etc.) converted from the obtained voice signal corresponds to the preset keyword voice information, the controller 180 can output audio data corresponding to the collected information of the events through the audio output unit 152.

FIG. 6(c) shows one example of security information for releasing a screen lock of the mobile terminal 100 being preset fingerprint information. Although a proximity of an object is sensed through the proximity sensor in the standby mode, if a screen lock is set in the mobile terminal 100, the controller 180 activates the fingerprint recognition unit 610 can then obtain a fingerprint information through the activated fingerprint recognition unit 610. In this instance, the fingerprint recognition unit 610 may be provided to the front or rear surface of the mobile terminal 100 or a prescribed region of the display 151.

The controller 180 can determine whether the obtained fingerprint information corresponds to the preset fingerprint information. If the obtained fingerprint information fails to correspond to the preset fingerprint information, the controller 180 does not provide the collected information of the events or can output only audio data corresponding to the information of the preset event through the audio output unit 152. If the obtained fingerprint information corresponds to the preset fingerprint information, the controller 180 can output audio data corresponding to the collected information of the events through the audio output unit 152.

Further, according to one embodiment of the present invention, the mobile terminal 100 can provide information of an event through an external device (e.g., an earphone, etc.) connected to the mobile terminal 100 by a short range wireless communication. This is described in detail with reference to FIG. 7 as follows.

In particular, FIG. 7 is a diagram illustrating one example of a method of providing information of an event through an external device connected to a mobile terminal by a short range communication according to one embodiment of the present invention. Referring to FIG. 7(a), the mobile terminal 100 is currently connected to an external device 700 by a short range wireless communication.

For instance, the external device 700 may include a Bluetooth earphone having an audio output unit 720. In addition, the display 151 of the mobile terminal 100 may be turned off and the mobile terminal 100 may be in standby mode. The controller 180 of the mobile terminal 100 can control the wireless communication unit 110 to maintain the short range communication connection to the external device 700 in the standby mode as well.

In this instance, the wireless communication unit 110 may include the wireless internet module 113 and/or the short range communication module 114. The external device 700 may also include a user input unit 710. If a prescribed command is input through the user input unit 710, the external device 700 sends a signal corresponding to the input command to the mobile terminal 100 by a wireless communication.

In the standby mode, if a signal corresponding to a preset user command is received from the external device 700, the controller 180 can collect information of a preset event. According to an embodiment, the controller 180 may have collected information of a preset event since having entered the standby mode.

Referring to FIG. 7(b), the controller 180 can send audio data corresponding to the collected information of the event to the external device 700 using short range communication. The external device 700 receives the audio data corresponding to the information of the event from the mobile terminal 100 and can output the received audio data through the audio output unit 720.

Since this is similar to the former descriptions with reference to FIGS. 2 to 6 except that the audio data corresponding to the information of the event is output not through the audio output unit 152 of the mobile terminal 100 but through the audio output unit 720 of the external device 700, its details are omitted from the following description.

Figure 8:
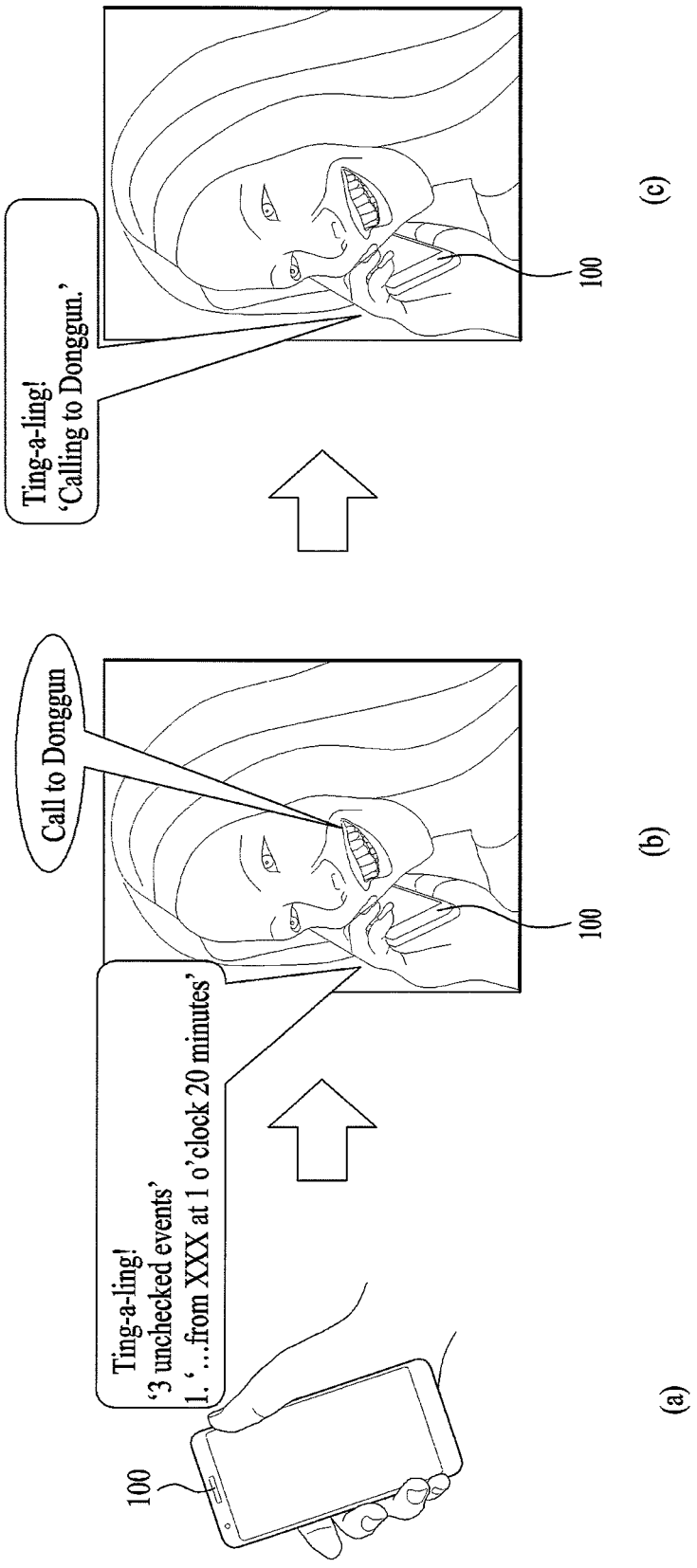
FIG. 8 is a diagram illustrating one example of activating a voice recognition function while providing information of an event when a mobile terminal according to one embodiment of the present invention is ready to enter a standby mode.

Further, according to one embodiment of the present invention, when the mobile terminal 100 has entered a standby mode already, a user may input a voice command. This is described in detail with reference to FIGS. 8 and 9 as follows. In particular, FIG. 8 is a diagram illustrating one example of activating a voice recognition function while providing information of an event when a mobile terminal is ready to enter a standby mode. Referring to FIG. 8(a), if the display 151 is turned off, the controller 180 switches the mobile terminal 100 to a standby mode. Referring to FIG. 8(b), while the display 151 is turned off, the controller 180 can sense a presence or non-presence of a proximity of an object through the proximity sensor. If the proximity of the object is sensed through the sensing unit, the controller 180 activates the audio output unit 152 and then outputs audio data corresponding to information of a preset event through the audio output unit 152.

Further, if the proximity of the object is sensed through the proximity sensor, the controller 180 activates the microphone 122 and can then obtain a voice signal through the activated microphone 122. Further, the controller 180 can activate a voice recognition function as well. Subsequently, the controller 180 can covert the obtained voice signal to text (e.g., 'Call to Donggun', etc.). According to an embodiment, if the voice signal is detected through the microphone 122, the controller 180 stops outputting the audio data currently output through the audio output unit 152, thereby preventing noise from being generated from voice recognition.

In addition, if the voice signal is detected through the microphone 122, the controller 180 can process the obtained voice signal more preferentially than the audio data corresponding to the information of the event, which is currently output through the audio output unit 152, and/or the audio data corresponding to the information of the event, which will be output through the audio output unit 152. According to an embodiment, since the text corresponding to the obtained voice signal is complicated due to a reason that a length of the text exceeds a preset length or the like, if the controller 180 is unable to perform the text conversion, the controller 180 can send the voice signal to an external server and then receive text conversion result from the external server.

Referring to FIG. 8(c), the controller 180 can execute a function of an application corresponding to the text converted from the voice signal. In particular, if a preset text (e.g., 'phone call', etc.) is contained in the text converted from the voice signal, the controller 180 executes a contact application (or a call application) corresponding to the preset text and can send a call signal to an external device corresponding to a name contained in the text converted from the voice signal using the executing application. Further, if a configuration module used to execute the function of the application is in an idle state, the controller 180 can activate the corresponding module.

According to an embodiment, the controller 180 can output audio data (e.g., 'Calling to Donggun'), which indicates that the function of the application corresponding to the text converted from the voice signal is currently executed in accordance with the voice recognition, through the audio output unit 152.

Figure 9:
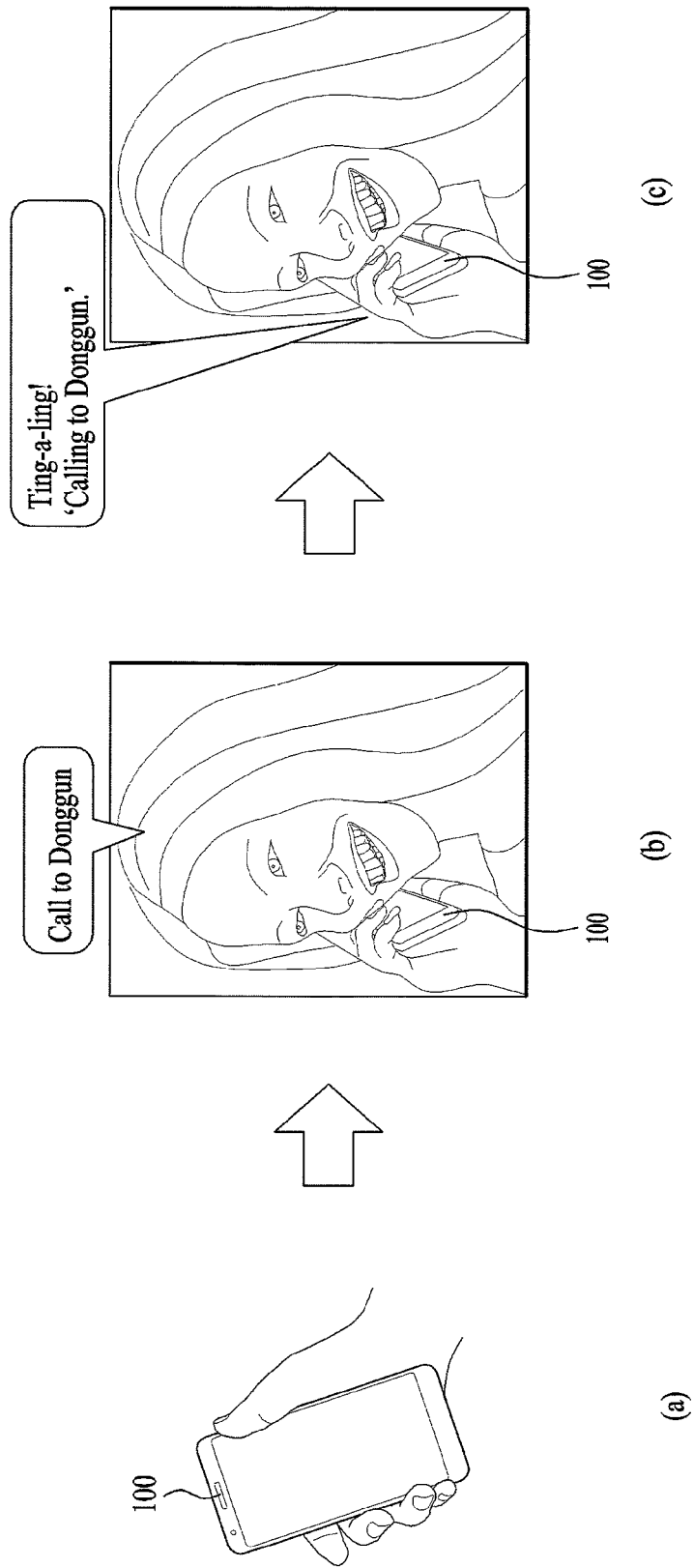
FIG. 9 is a diagram illustrating another example of activating a voice recognition function when a mobile terminal according to one embodiment of the present invention is ready to enter a standby mode.

Next, FIG. 9 is a diagram illustrating another example of activating a voice recognition function when a mobile terminal according to one embodiment of the present invention is ready to enter a standby mode. Referring to FIG. 9(a), if the display 151 is turned off, the controller 180 switches the mobile terminal 100 to a standby mode.

Referring to FIG. 9(b), while the display 151 is turned off, the controller 180 can sense a presence or non-presence of a proximity of an object through the proximity sensor. If the proximity of the object is sensed through the sensing unit, the controller 180 activates the microphone 122 and can then obtain a voice signal through the activated microphone 122. Subsequently, the controller 180 can covert the obtained voice signal to text (e.g., 'Call to Donggun', etc.). The present embodiment differs from the former embodiment described with reference to FIG. 7 in that a user just inputs a desired command with a voice by holding the mobile terminal 100 in the standby mode to their ear, irrespective of whether information of an event is provided in the standby mode.

Referring to FIG. 9(c), the controller 180 can execute a function of an application corresponding to the text converted from the voice signal. In particular, if a preset text (e.g., 'phone call', etc.) is contained in the text converted from the voice signal, the controller 180 executes a contact application (or a call application) corresponding to the preset text and can send a call signal to an external device corresponding to a name contained in the text converted from the voice signal using the executing application. Further, if a configuration module used to execute the function of the application is in an idle state, the controller 180 can activate the corresponding module.

According to the examples shown in FIGS. 8 and 9, sending a call signal to a specific mobile terminal saved in the memory 170 of the mobile terminal 100 is taken as an example. According to an embodiment, a user can speak a voice command corresponding to a specific phone number (numerals). Further, according to one embodiment of the present invention, while the mobile terminal 100 provides information of an event in standby mode, if a specific signal is detected, the mobile terminal 100 activates the display 151 and can provide detailed information of the event. This is described in detail with reference to FIG. 10 as follows.

Figure 10:
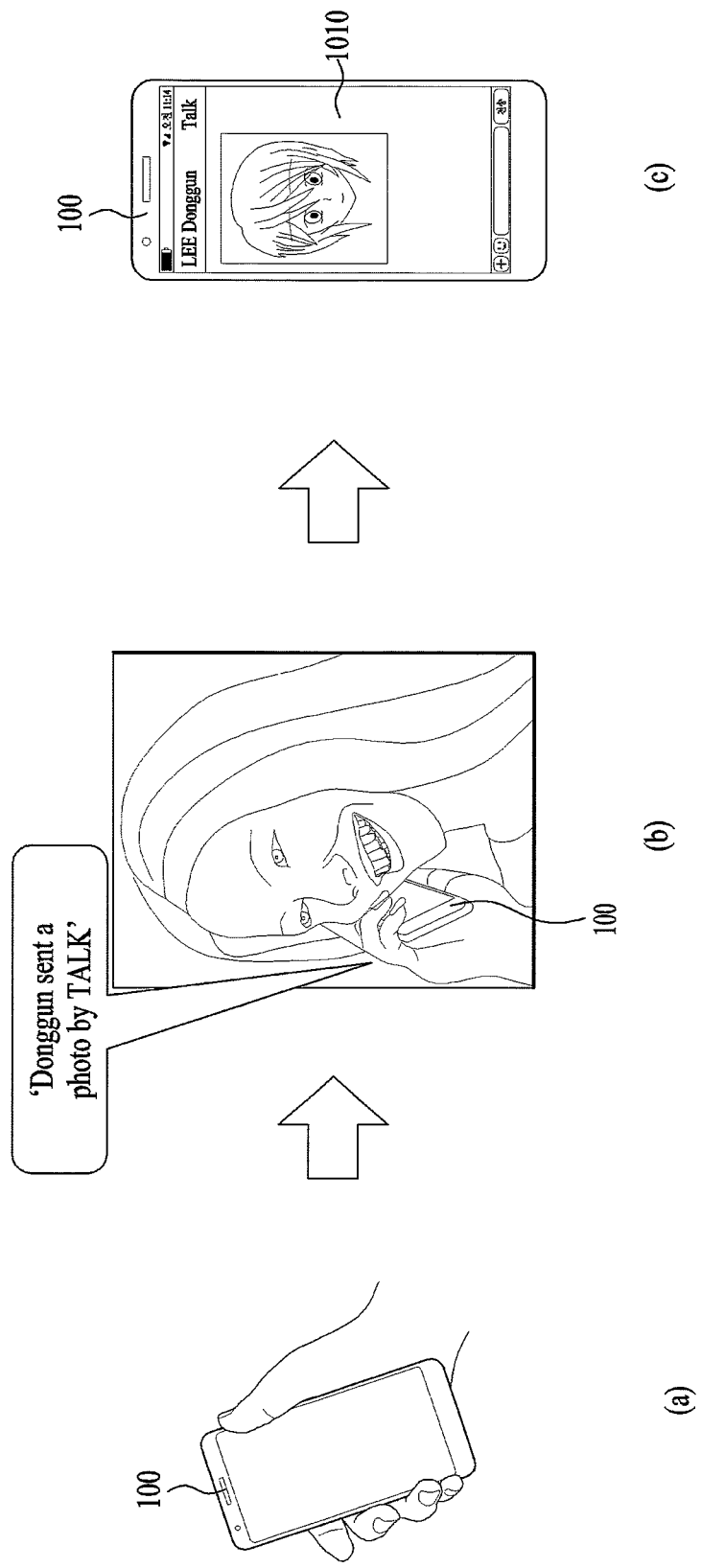
FIG. 10 is a diagram illustrating one example of a method of providing a detailed information of an event in a mobile terminal according to one embodiment of the present invention.

In particular, FIG. 10 is a diagram illustrating one example of a method of providing detailed information of an event in a mobile terminal according to one embodiment of the present invention. Referring to FIG. 10(a), if the display 151 is turned off, the controller 180 switches the mobile terminal 100 to a standby mode. Referring to FIG. 10(b), while the display 151 is turned off, if a proximity of an object is sensed through the sensing unit, the controller 180 activates the audio output unit 152 and then outputs audio data corresponding to information of a preset event through the audio output unit 152.

Referring to FIGS. 10(b) and 10(c), while first audio data corresponding to information of a first event among preset events is output, the controller 180 can detect a release of the proximity of the object through the proximity sensor. If the release of the proximity of the object is sensed while outputting the first audio data, the controller 180 activates the display 151, executes a first application corresponding to the first event, and can display an executing screen 1010 of the first application on the display 151.

In this instance, the executing screen 1010 may include detailed information related to the first event among the executing screens of the first application. For instance, if the first event corresponds to a reception of a new SNS message from a specific friend registered at an SNS application, the executing screen 1010 may include a chat window with the specific friend, which contains a content of the received SNS message.

Figure 11:
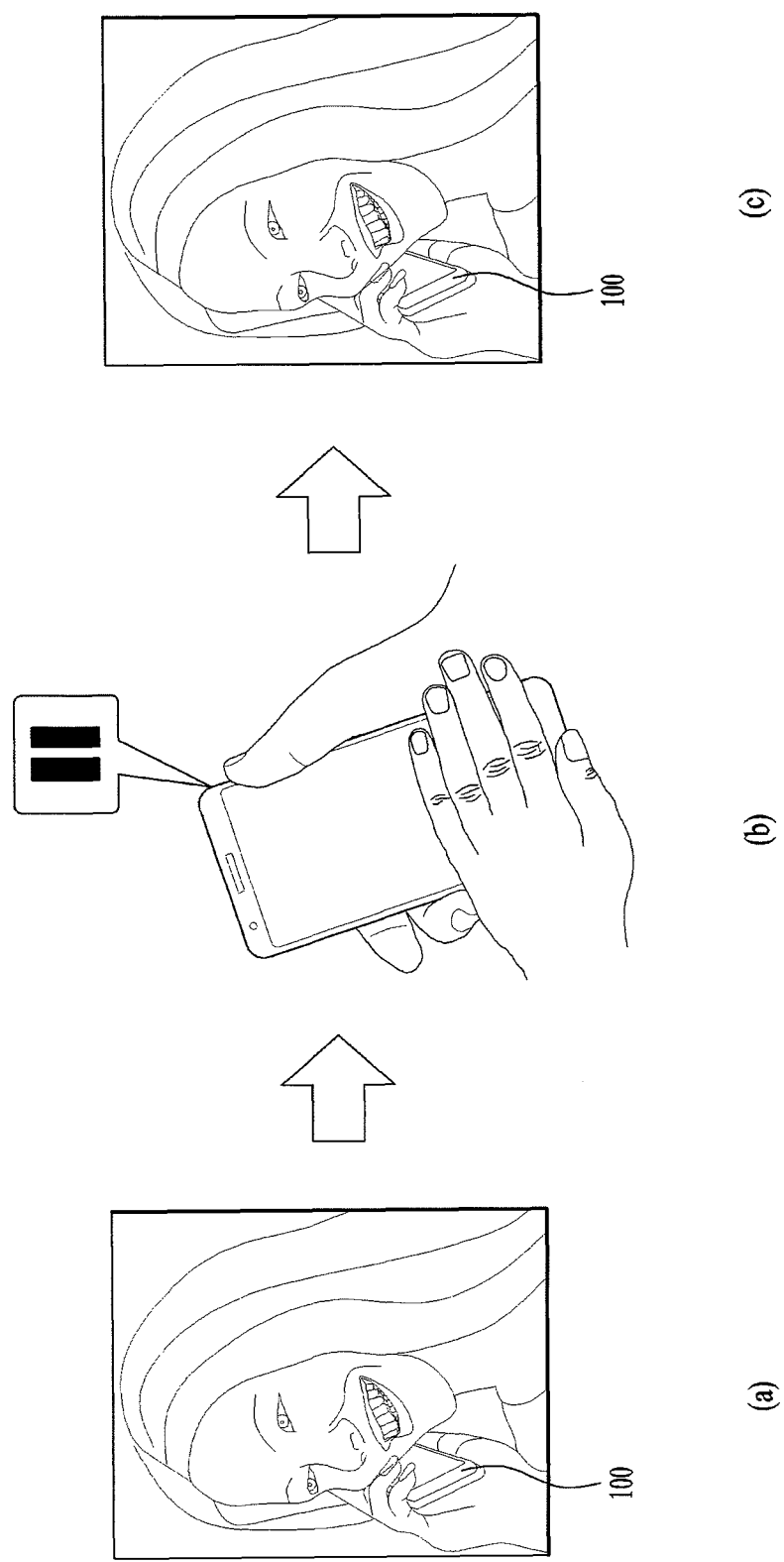
FIG. 11 is a diagram illustrating one example of a method of pausing to provide information of an event in a mobile terminal according to one embodiment of the present invention.

Next, FIG. 11 is a diagram illustrating one example of a method of pausing to provide information of an event in a mobile terminal according to one embodiment of the present invention. Referring to FIG. 11(a), while the display 151 is turned off and the standby mode is entered, if a proximity of an object is sensed through the sensing unit, the controller 180 activates the audio output unit 152 and then outputs audio data corresponding to information of a preset event through the audio output unit 152. According to the present embodiment, the display 151 may include a touch sensor. For instance, the display 151 may include a touchscreen.

As the proximity of the object is sensed through the sensing unit or while audio data is output through the audio output unit 152, the controller 180 can activate the touch sensor. According to an embodiment, the controller 180 can activate only a part of the touch sensor corresponding to a preset region on a screen of the display 151.

Referring to FIG. 11(b), while the audio data corresponding to the information of the event is output through the audio output unit 152, the controller 180 can sense a command of touching a preset region of the display 151. If the command of touching the preset region of the display 151 is sensed, the controller 180 can pause the output of the audio data.

Further, according to an embodiment, the mobile terminal 100 may further include a second proximity sensor. In this instance, the second proximity sensor may be provided to a bottom part of the display 151 or located adjacent to the bottom part of the display 151. If the proximity of the object is sensed through the proximity sensor (or a first proximity sensor), the controller 180 activates the second proximity sensor. While the audio data corresponding to the information of the event is output through the audio output unit 152, if a proximity of an object is sensed through the second proximity sensor, the controller 180 can pause the output of the audio data.

Referring now to FIG. 11(c), while the output of the audio data is paused, if a release of the touch to the preset region of the display 151 is sensed, the controller 180 can resume the output of the audio data by starting with a timing point of the pause. According to one embodiment, while the output of the audio data is paused, if a proximity of the object is sensed again through the proximity sensor, the controller 180 can resume the output of the audio data by starting with a timing point of the pause. According to another embodiment, while the output of the audio data is paused, if the release of the touch to the preset region of the display 151 and the proximity of the object through the proximity sensor are sensed, the controller 180 can resume the output of the audio data by starting with a timing point of the pause.

Generally, when a user is distracted while making a phone call due to a situation that the user is addressed by a third party, the user generally takes an action of covering the microphone 122 provided to the bottom part of the mobile terminal 100 with their hand. Hence, according to the present embodiment, when a user is distracted while listening to an event information provided by the mobile terminal 100 due to a situation that the user is addressed by a third party, the user can pause the listening to the event information by taking an action of covering the microphone 122 provided to the bottom part of the mobile terminal 100 with a hand like the usual habit on making a phone call.

Figure 12:
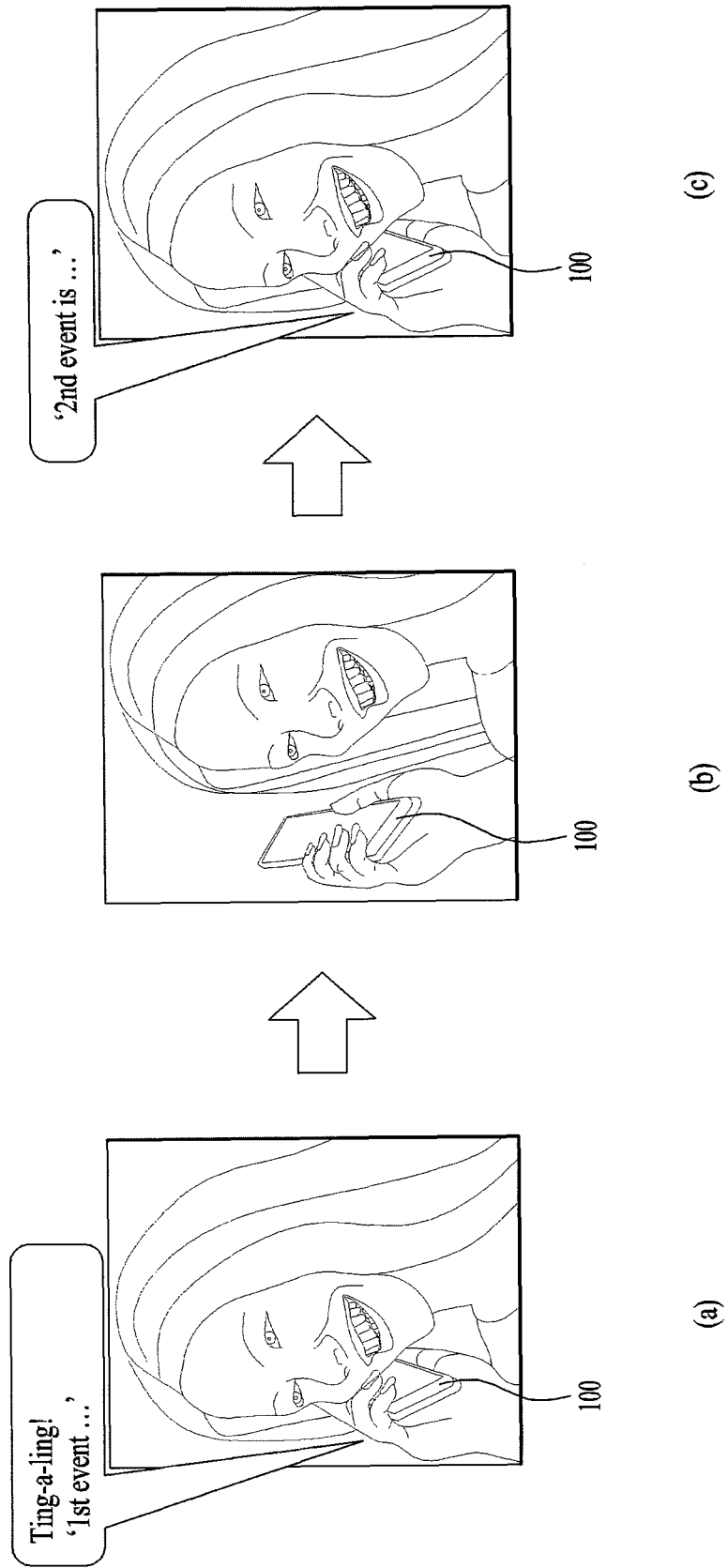
FIG. 12 is a diagram illustrating another example of a method of providing information of an event in a mobile terminal according to one embodiment of the present invention.

Next, FIG. 12 is a diagram illustrating another example of a method of providing information of an event in a mobile terminal according to one embodiment of the present invention. Referring to FIG. 12(a), while the display 151 is turned off and the standby mode is entered, if a proximity of an object is sensed through the sensing unit, the controller 180 activates the audio output unit 152 and can then output first audio data corresponding to information of a first event through the audio output unit 152.

Referring to FIGS. 12(a) and 12(b), while the first audio data is output, the controller 180 can sense a proximity release of the object through the proximity sensor. If the proximity release of the object is sensed through the proximity sensor while outputting the first audio data, the controller 180 can pause the output of the first audio data.

Referring to FIGS. 12(b) and 12(c), while the output of the first audio data is paused, if a proximity of an object is sensed through the proximity sensor, the controller 180 can output second audio data, which corresponds to information of a second event different from the first event, to the audio output unit 152. For instance, the second event may include an event occurring right before the first event or an event occurring right after the first event among the collected events.

While a user is making a phone call, if a call volume is too high or a call content is not satisfied, the user generally takes an action of spacing the mobile terminal 100 apart from their ear for a while. Hence, if a proximity release of an object is sensed while outputting the first audio data, the controller 180 can determine that the user does not want to listen to the information of the first event corresponding to the first audio data or that the user is not interested in the occurrence of the first event.

Hence, if a proximity release of an object is sensed while outputting the first audio data, the controller 180 pauses the output of the first audio data. If the proximity of the object is sensed again, the controller 180 can output the second audio data, which corresponds to the second event different from the first event among the collected event information, through the audio output unit 152. If uninteresting information is provided by the mobile terminal 100, the user can listen to information of a next event by taking an action of spacing the mobile terminal 100 apart from their ear for a while and then holding the mobile terminal 100 to their ear again.

According to an embodiment, if a proximity release of an object is sensed while outputting the first audio data, the controller 180 can save the information of the first event in the memory 170. Thereafter, while the mobile terminal 100 is being used, if the display 151 is turned off and the standby mode is re-entered, the controller 180 can utilize the saved information of the first event in collecting information of events.

If the user spaces the mobile terminal 100 apart from their ear while outputting the information of the first event, this may indicate that the user is not interested in the first event. Hence, when the controller 180 collects information of events in the future, the controller 180 can collect information of events except the information related to the first event.

Figure 13:
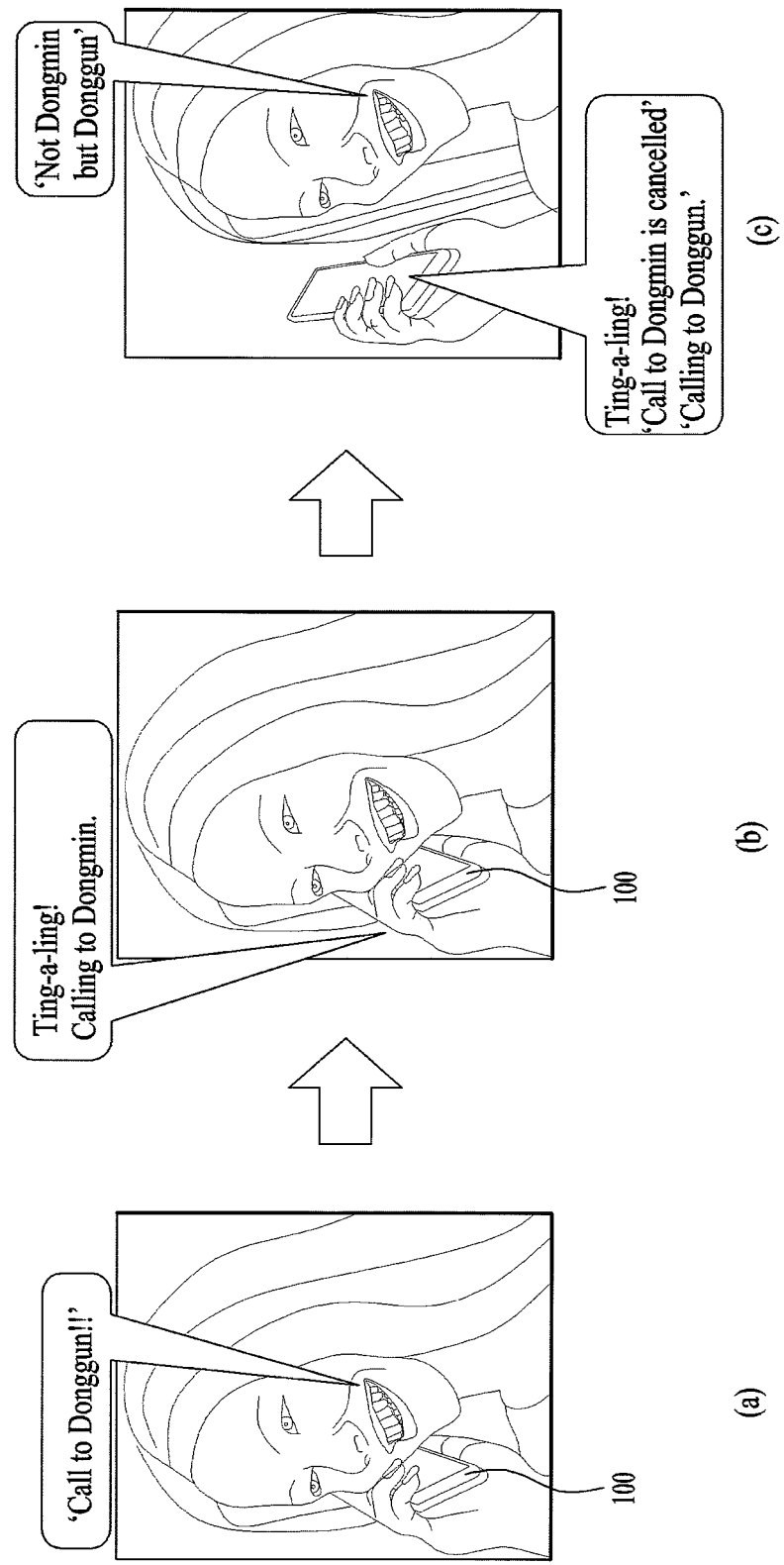
FIG. 13 is a diagram illustrating one example of a method of modifying and inputting a voice command in a mobile terminal according to one embodiment of the present invention.

Next, FIG. 13 is a diagram illustrating one example of a method of modifying and inputting a voice command in a mobile terminal according to one embodiment of the present invention. Referring to FIG. 13(a), if a proximity of an object is sensed through the proximity sensor in the standby mode, the controller 180 can activate the microphone 122.

Further, the controller 180 can activate a voice recognition function as well. Thus, the user can speak a desired voice command (e.g., 'Call to Donggun', etc.) by holding the mobile terminal 100 to their ear. The user can speak the voice command right after holding the mobile terminal 100 in the standby mode to the user's ear. The user can also speak the voice command while outputting audio data corresponding to information of an event, as mentioned in the foregoing description with reference to FIG. 5. In the latter case, if a voice signal is detected through the microphone 122 while outputting the audio data, the controller 180 can pause or stop the output of the audio data.

Referring to FIG. 13(a) and FIG. 13(b), the controller 180 converts a voice signal obtained through the microphone 122 into text and can execute a function of an application (e.g., a phone function of a contact application) corresponding to the text (e.g., 'Call to Dongmin') converted from the voice signal. According to an embodiment, the controller 180 can output audio data (e.g., 'Calling to Dongmin'), which indicates that the function of the application corresponding to the text (for clarity, named a first text) converted from the voice signal is currently executed in accordance with a voice recognition, through the audio output unit.

Referring to FIGS. 13(b) and 13(c), the controller 180 can sense a proximity release of the object through the proximity sensor after obtaining the voice signal, after completion of the text conversion, before executing the function of the application, while executing the function of the application, or while outputting the audio data indicating that the function of the application corresponding to the text converted from the voice signal is currently executed. If the proximity release of the object is sensed, the controller 180 re-obtains a voice signal through the microphone 122, converts the re-obtained voice signal into text (for clarity, named a second text), and can then execute a function of an application corresponding to the second text (e.g., 'Call not to Dongmin but to Donggun') converted from the re-obtained voice signal.

The controller 180 cancels the running of the function of the first application corresponding to the first text and can execute the function of the application corresponding to the second text converted from the re-obtained voice signal. For instance, the controller 180 cancels a call signal transmission to an external device corresponding to a contact information 'Dongmin' registered at a contact application and can send a call signal to an external device corresponding to a contact information 'Donggun' registered at the contact application. According to an embodiment, the controller 180 cancels the execution of the function of the application corresponding to the first text and can output an audio data, which indicates that the function of the application corresponding to the second text is executed, to the audio output unit 152.

While a phone call is made, if a call counterpart is unable to clearly understand the user, the user generally speaks by spacing the mobile terminal 100 apart from their ear and then moving a microphone provided part of the mobile terminal 100 closer to their mouth. Hence, according to the present embodiment, if the voice recognition is performed in a way different from the user's intention, the user can take an action of re-inputting a voice command by spacing the mobile terminal 100 apart from their ear for a while and moving the microphone provided part closer to the user's mouth.

According to the description of the present embodiment, the controller 180 sensing the user's intention to modify a voice through the proximity sensor is taken as an example. However, according to an embodiment, the controller 180 can determine a user's intention to modify a voice command by sensing a movement of the mobile terminal 100 using the sensing unit 140 including an acceleration sensor, a gyroscopic sensor and/or the like.

Figure 14:
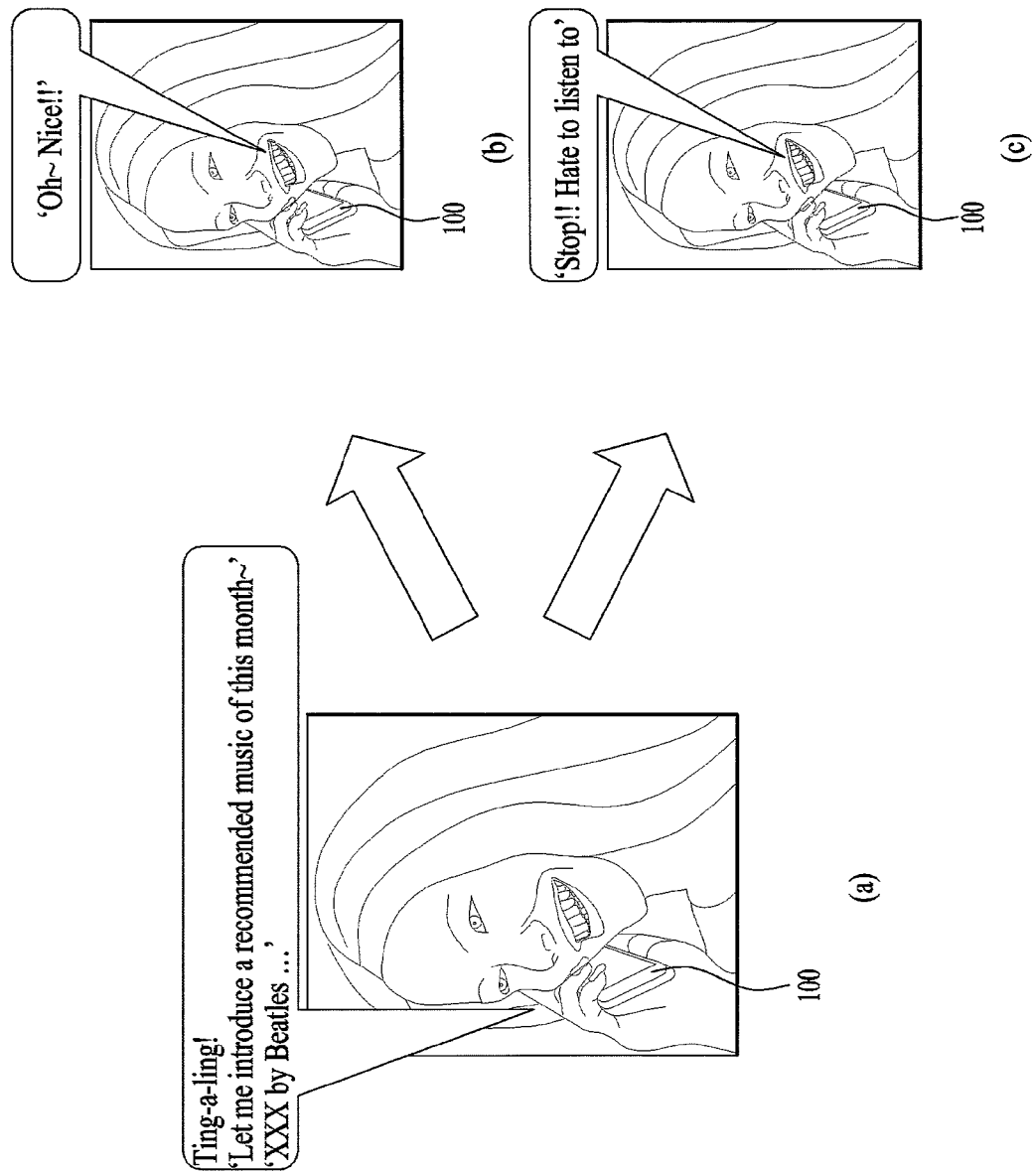
FIG. 14 is a diagram illustrating one example of a method of differentiating a type of an event provided in accordance with a user's preference in a mobile terminal according to one embodiment of the present invention.

In particular, FIG. 14 is a diagram illustrating one example of a method of differentiating a type of an event provided in accordance with a user's preference in a mobile terminal according to one embodiment of the present invention. Referring to FIG. 14(a), if a proximity of an object is sensed through the proximity sensor in a standby mode, the controller 180 activates the audio output unit 152 and outputs first audio data corresponding to information of a first event through the audio output unit 152. For instance, the first event may correspond to a recommended music content belonging to a first genre.

Further, if a proximity of an object is sensed through the proximity sensor in the standby mode, the controller 180 can activate the microphone 122 and obtain a voice signal through the microphone 122 while outputting the first audio data. Subsequently, the controller 180 converts the obtained voice signal into text and can then determine whether the text converted from the voice signal corresponds to a positive meaning or a negative meaning. The controller 180 can also store information of text having a positive meaning and information of text having a negative meaning in the memory 170.

For instance, referring to FIG. 14(b), if the text (e.g., 'nice') converted from the voice signal corresponds to the positive meaning based on the information saved in the memory 170, the controller 180 can save a determination result of the text in the memory 170 by being mapped to the first event. Thereafter, while the mobile terminal 100 is used, if the display 151 is turned off and the standby mode is re-entered, the controller 180 can use the determination result of the text in collecting information of events. In particular, when the controller 180 collects information of events in the future, the controller 180 can increase a recommendation rate of the recommended music content of the first genre corresponding to the information of the first event or a recommendation priority of the recommended music content of the first genre.

Further, referring to FIG. 14(c), if the text (e.g., 'Stop, hate to listen to') converted from the voice signal corresponds to the negative meaning based on the information saved in the memory 170, the controller 180 can save a determination result of the text in the memory 170 by being mapped to the first event. Thereafter, while the mobile terminal 100 is used, if the display 151 is turned off and the standby mode is re-entered, the controller 180 can use the determination result of the text in collecting information of events. In particular, when the controller 180 collects information of events in the future, the controller 180 can decrease a recommendation rate of the recommended music content of the first genre corresponding to the information of the first event or a recommendation priority of the recommended music content of the first genre.

Further, according to one embodiment of the present invention, while the display 151 of the mobile terminal 100 is turned on, if a proximity of an object is sensed through the proximity sensor, a control mode of a currently executing application can be switched to a voice control mode. This is described in detail with reference to FIGS. 15 and 16 as follows.

Figure 15:
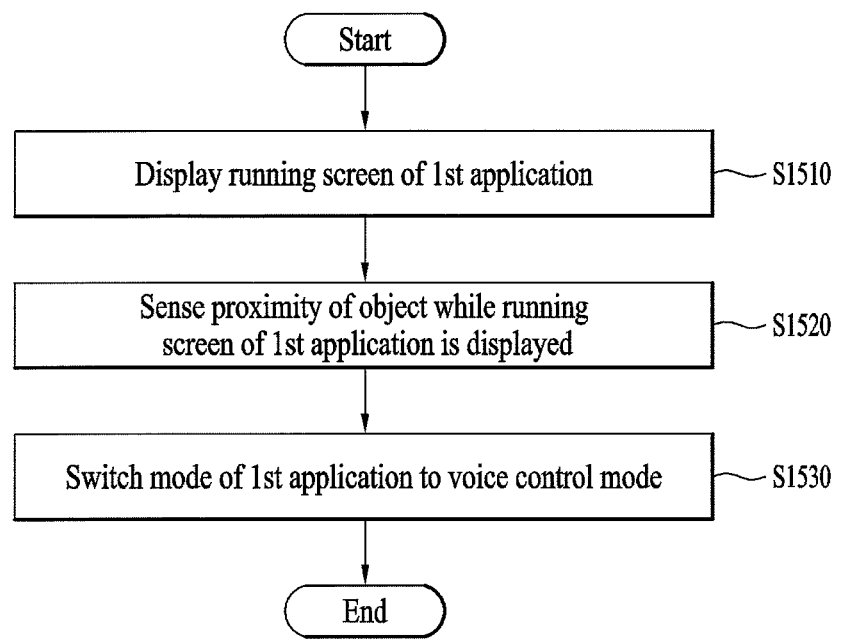
FIG. 15 is a flowchart illustrating one example of a method of switching a mode of an application by obtaining an intention of a user using a mobile terminal in an activated state of a display unit in a mobile terminal according to one embodiment of the present invention.

In particular, FIG. 15 is a flowchart illustrating one example of a method of switching a mode of an application by obtaining an intention of a user using a mobile terminal in an activated state of a display unit in a mobile terminal according to one embodiment of the present invention.

Referring to FIG. 15, the controller 180 displays an executing screen of a first application on the display 151 (S1510). In this instance, the first application may be executed by a user's launch command. Alternatively, as mentioned in the foregoing description with reference to FIG. 10, the first application may be executed if a proximity release is sensed through the proximity sensor.

While the executing screen of the first application is displayed on the display 151, the controller 180 can sense a presence or non-presence of a proximity of an object through the proximity sensor (S1520). While the executing screen of the first application is displayed on the display 151, if the proximity of the object is sensed through the proximity sensor, the controller 180 can switch a control mode of the first application to a voice control mode (S1530).

The meaning of 'switching the control mode of the first application to the voice control mode' may mean that a prescribed function of the first application can be executed/controlled in response to a voice command spoken by a user. According to an embodiment, if the voice command includes a preset trigger command (e.g., #, sharp, hash tag, etc.), the controller 180 can execute/control a prescribed function of a second application interworking with the first application or a prescribed function of a third application unrelated to the first application. While the first application is executed, if a user holds the mobile terminal to their ear, a user's intention can be regarded as intending to control a function of the first application through a voice command.

Figure 16:
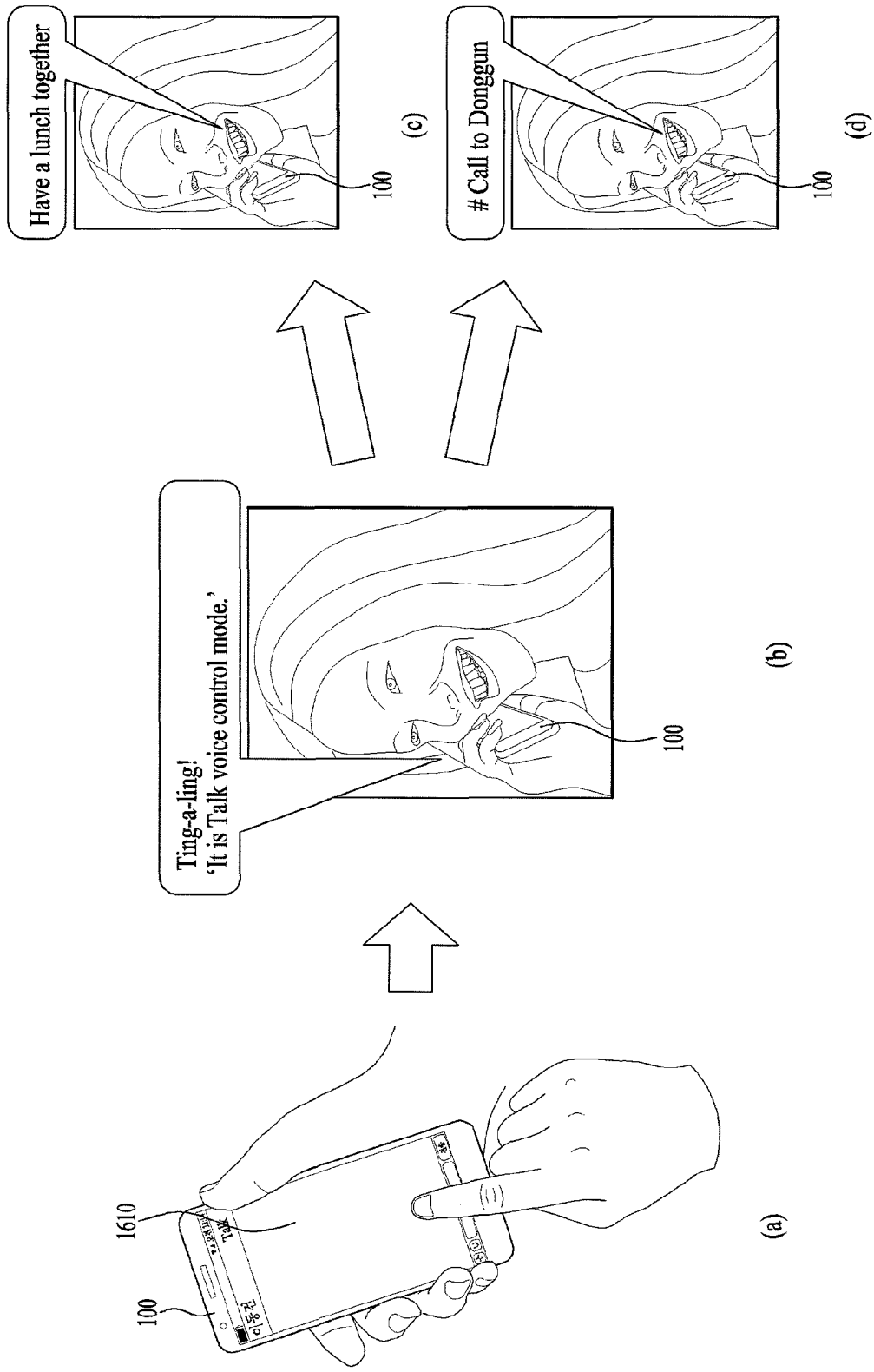
FIG. 16 is a diagram illustrating one example of a method of switching a mode of an application by obtaining an intention of a user using a mobile terminal in an activated state of a display unit in a mobile terminal according to one embodiment of the present invention.

Next, FIG. 16 is a diagram illustrating one example of a method of switching a mode of an application by obtaining an intention of a user using a mobile terminal in an activated state of a display unit in a mobile terminal according to one embodiment of the present invention.

Referring to FIG. 16(a), the controller 180 can display an executing screen 1610 of a first application on the display 151. Referring to FIGS. 16(a) and 16(b), if a proximity of an object is sensed through the proximity sensor, the controller 180 can switch a mode (or a control mode) of the first application to a voice control mode. According to an embodiment, the controller 180 can output audio data such as a notification sound, a notification message, and/or like, which indicates that the control mode of the first application is switched to the voice control mode, to the audio output unit 152.

If the mode of the first application is switched to the voice control mode, the controller 180 activates the microphone 122 and can activate a voice recognition function. Subsequently, the controller 180 obtains a voice signal through the microphone 122 and can then convert the obtained voice signal into text.

Referring to FIG. 16(*c*), the controller 180 can execute the function of the first application corresponding to the text (e.g., 'Have a lunch together') converted from the voice signal. In this instance, the function of the first application corresponding to the text converted from the voice signal may vary based on the executing screen displayed on the display 151 on sensing the proximity of the object through the proximity sensor.

For instance, if the first application is an SNS application and the executing screen 1610 includes a chat window with a specific friend registered at the SNA application, the controller 180 can display the text converted from the voice signal on the executing screen 1610. In particular, the controller 180 can display the text converted from the voice signal within text input window included in the executing screen 1610.

Further, referring to FIG. 16(*d*), if the text (e.g., '# Call to Donggun') converted from the voice signal includes a preset trigger command (e.g., '#'), the controller 180 can execute a function of a second application different from the first application. In this instance, the second application may include an application capable of interworking with the first application and/or an application unrelated to the first application. For instance, when the first application is an SNS application, the second application may include one of a call application interworking with the SNS application, a gallery application interworking with the SNS application, a camera application interworking with the SNS application, and the like, or a web browser application unrelated to the SNS application.

According to the present embodiment, when the first application is an SNS application, if the text (e.g., '# Call to Donggun') converted from the voice signal includes a preset trigger command (e.g., '#'), the controller 180 can execute the call application interworking with the SNS application and can send a call signal to an external device corresponding to a specific friend (e.g., 'Donggun') registered at the SNS application.

According to an embodiment, the controller 180 can determine whether a command spoken by a user intends to execute a function of a first application or a function of a second application interworking with or unrelated to the first application, by a method different from that depending on whether the trigger command is included. For instance, the controller 180 analyzes a content of text corresponding to a voice signal obtained through the microphone 122 and can then determine a voice command included in the voice signal is related to which one of the first application or the second application based on the analyzed content.

In another instance, after a voice signal has been obtained through the microphone 122, if a proximity release of an object is sensed through the proximity senor with a preset time, the controller 180 can determine that a voice command contained in the voice signal is related to the first application. After a voice signal has been obtained through the microphone 122, if a proximity release of an object is not sensed through the proximity senor with a preset time, the controller 180 can determine that a voice command contained in the voice signal is related to the second application.

Accordingly, embodiments of the present invention provide the following advantages. First, a mobile terminal and controlling method provide information fit for an intention of a user using the mobile terminal in a deactivated state of a display unit. In addition, a solution for obtaining an intention of a user using the mobile terminal in a deactivated state of a display unit can be provided.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
 a display;
 a proximity sensor configured to sense proximity of an object;
 an audio output unit; and
 a controller configured to:
 deactivate the display and enter the mobile terminal into a standby mode while maintaining the proximity sensor in an activated state, and
 if the proximity of the object is sensed through the proximity sensor, output audio data through the audio output unit while the display is deactivated corresponding to information collected about a previous event that occurred on the mobile terminal.

2. The mobile terminal of claim 1, further comprising:
 a microphone,
 wherein if the proximity of the object is sensed through the proximity sensor, the controller is further configured to activate the microphone, obtain a voice signal through the microphone, convert the voice signal into text, and execute a function of an application corresponding to the converted text.

3. The mobile terminal of claim 2, wherein in response to the voice signal being input while the audio data is output through the audio output unit, the controller is further configured to preferentially process the voice signal more than the audio data.

4. The mobile terminal of claim 1, wherein the controller is further configured to:
 output first audio data related to a first application through the audio output unit corresponding to the information collected about the event, and
 if the proximity of the object is sensed through the proximity sensor, activate the display and display an executing screen of the first application on the display.

5. The mobile terminal of claim 4, wherein the executing screen of the first application includes detailed information of the event related to the first application.

6. The mobile terminal of claim 1, wherein the controller is further configured to:
display a lock screen on the display, and
if the proximity of the object is sensed through the proximity sensor,
activate an interface for receiving security information for releasing the lock screen.

7. The mobile terminal of claim 1, wherein the controller is further configured to:
display a lock screen on the display, and
if the proximity of the object is sensed through the proximity sensor, output only audio data corresponding to information of a preset event among multiple events.

8. The mobile terminal of claim 1, wherein the controller is further configured to:
in response to the output of the audio data starting, activate a touch sensor of the display,
in response to a touching of a preset region of the display while the audio data is output, pause the output of the audio data, and
in response to a touch release of the preset region of the display, resume the output of the audio data by starting with a timing point of pausing the output of the audio data.

9. The mobile terminal of claim 1, wherein the controller is further configured to:
if the proximity of the object is sensed through the proximity sensor while first audio data corresponding to information of a first event among multiple events is output through the audio output unit, stop the output of the first audio data, and
in response to the output of the first audio data being stopped, and the proximity of the object again being sensed, output second audio data through the audio output unit corresponding to information of a second event different from the first event among the multiple events.

10. The mobile terminal of claim 2, wherein the controller is further configured to:
output the audio data corresponding to the converted text through the audio output unit,
if the proximity of the object is sensed through the proximity sensor while outputting the audio data corresponding to the text or after outputting the audio data corresponding to the text,
re-obtain a voice signal through the microphone,
convert the re-obtained voice signal into second text, and
execute a function of an application corresponding to the converted second text.

11. The mobile terminal of claim 10, wherein the controller is further configured to output audio data through the audio output unit indicating a cancellation of executing the function of the application corresponding to the text converted from the obtained voice signal.

12. The mobile terminal of claim 1, wherein the collected information of the event comprises at least one of information corresponding to a call signal received during the standby mode, information corresponding to text message received during the standby mode, information corresponding to an SNS message received during the standby mode, a nearby environment notification information based on a location information of the mobile terminal, information based on a current time, information based on the location information of the mobile terminal, a recommended content information based on information of a user of the mobile terminal, or a recommended content information based on a use pattern of the mobile terminal.

13. The mobile terminal of claim 12, further comprising:
a microphone; and
a memory configured to store information of text having a positive meaning and information of text having a negative meaning,
wherein if the proximity of the object is sensed through the proximity sensor, the controller is further configured to:
activate the microphone,
obtain a voice signal through the microphone while an output of first audio data corresponding to information of a first event among multiple occurring events,
convert the obtained voice signal into text, determine whether the converted text corresponds to the positive meaning or the negative meaning based on the information saved in the memory, and
map a determination result of the text to the first event in the memory.

14. The mobile terminal of claim 13, wherein in response to the converted text being determined as having the positive meaning, the controller is further configured to increase a recommendation rate of a recommended content corresponding to the information of the first event.

15. The mobile terminal of claim 13, wherein in response to the converted text being determined as having the negative meaning, the controller is further configured to decrease a recommendation rate of a recommended content corresponding to the information of the first event.

16. A method of controlling a mobile terminal, the method comprising:
sensing, via a proximity sensor, proximity of an object;
deactivating, via a controller of the mobile terminal, a display of the mobile terminal, and enter the mobile terminal into a standby mode while maintaining the proximity sensor in an activated state; and
if the proximity of the object is sensed through the proximity sensor, outputting audio data through an audio output unit while the display is deactivated corresponding to information collected about a previous event that occurred on the mobile terminal.

17. The method of claim 16, further comprising:
if the proximity of the object is sensed through the proximity sensor, activating the microphone, obtaining a voice signal through the microphone, converting the voice signal into text, and executing a function of an application corresponding to the converted text.

18. The method of claim 17, wherein in response to the voice signal being input while the audio data is output through the audio output unit, preferentially processing, via the controller, the voice signal more than the audio data.

19. The method of claim 16, further comprising:
outputting first audio data related to a first application through the audio output unit corresponding to the information collected about the event; and
if the proximity of the object is sensed through the proximity sensor, activating the display and displaying an executing screen of the first application on the display.

20. The method of claim 19, wherein the executing screen of the first application includes detailed information of the event related to the first application.

* * * * *